(12) United States Patent
Rota Martir et al.

(10) Patent No.: US 9,787,068 B2
(45) Date of Patent: Oct. 10, 2017

(54) ASSEMBLY FOR A WITHDRAWABLE SWITCHING DEVICE AND RELATED SWITCHING DEVICE

(71) Applicant: ABB S.p.A., Milan (IT)

(72) Inventors: Roberto Rota Martir, Brembate di Sopra (IT); Gustavo Brignoli, Bergamo (IT); Roberto Zanni, Fino del Monte (IT); Wainer Fumagalli, Bergamo (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/314,793

(22) PCT Filed: Jan. 15, 2015

(86) PCT No.: PCT/EP2015/050712
§ 371 (c)(1),
(2) Date: Nov. 29, 2016

(87) PCT Pub. No.: WO2015/180846
PCT Pub. Date: Dec. 3, 2015

(65) Prior Publication Data
US 2017/0207610 A1    Jul. 20, 2017

(30) Foreign Application Priority Data

May 30, 2014    (WO) ................. PCT/EP2014/061272

(51) Int. Cl.
*H01R 4/46*    (2006.01)
*H02B 11/24*    (2006.01)

(52) U.S. Cl.
CPC .................... *H02B 11/24* (2013.01)

(58) Field of Classification Search
CPC ........ H02B 11/24; H02B 1/36; H02B 11/127; H02B 11/12

(Continued)

(56) References Cited

U.S. PATENT DOCUMENTS

| 4,565,908 A | 1/1986 | Bould |
| 5,486,978 A * | 1/1996 | Fishovitz ............... H02B 11/24 200/50.21 |

(Continued)

FOREIGN PATENT DOCUMENTS

| DE | 2826387 A1 | 12/1979 |
| JP | S55115215 U | 8/1980 |
| WO | 2012120012 A1 | 9/2012 |

OTHER PUBLICATIONS

International Search Report and Written Opinion, PCT/EP2015/050712, ABB S.p.A., Apr. 7, 2015, 9 pages.

(Continued)

*Primary Examiner* — Jean F Duverne
(74) *Attorney, Agent, or Firm* — Taft Stettinius & Hollister LLP

(57) ABSTRACT

An assembly for a low voltage withdrawable switching device, comprising: a supporting frame into which/from which a switching unit of the withdrawable switching device can be inserted/withdrawn; a first connector placed at and protruding from a bottom portion of the supporting frame, which is adapted to be coupled with a second connector of the switching unit; and a shutter assembly. The shutter assembly comprises: an opening for allowing the coupling between the first and second connectors; a cover member which is adapted to be moved from a cover position to an open position so as to make the opening accessible for the coupling between the first and second connectors. The cover member is adapted to be moved from the cover position to the open position by the first connector. The shutter assembly is operatively mounted movable into the supporting frame. The shutter assembly is adapted to operatively interact with the switching unit under insertion into the supporting frame so as to be moved towards the bottom portion for (Continued)

causing the movement of the cover member from the cover to the open position by the first connector.

20 Claims, 19 Drawing Sheets

(58) Field of Classification Search
USPC .......................................................... 439/100
See application file for complete search history.

(56) References Cited

U.S. PATENT DOCUMENTS

| | | | |
|---|---|---|---|
| 5,505,630 A * | 4/1996 | Petrisko | H02G 5/06 |
| | | | 439/114 |
| 5,508,891 A * | 4/1996 | Rowe | H02B 11/12 |
| | | | 361/727 |
| 6,244,891 B1 * | 6/2001 | Robbins | H02B 11/127 |
| | | | 200/50.01 |
| 7,440,259 B1 | 10/2008 | Deylitz et al. | |
| 8,730,652 B2 * | 5/2014 | Faber | H01R 13/04 |
| | | | 174/72 B |
| 8,817,454 B2 * | 8/2014 | Morris | F02D 11/02 |
| | | | 200/50.11 |
| 9,299,522 B2 * | 3/2016 | Sudhakar | H01H 71/0221 |
| 9,312,668 B2 * | 4/2016 | Faber | H01H 9/22 |
| 9,368,947 B2 * | 6/2016 | Yee | H02B 1/36 |
| 2004/0074400 A1 * | 4/2004 | Song | A23N 12/10 |
| | | | 99/483 |

OTHER PUBLICATIONS

International Search Report and Written Opinion, PCT/EP2014/061272, ABB S.p.A., Jan. 23, 2015, 9 pages.

* cited by examiner

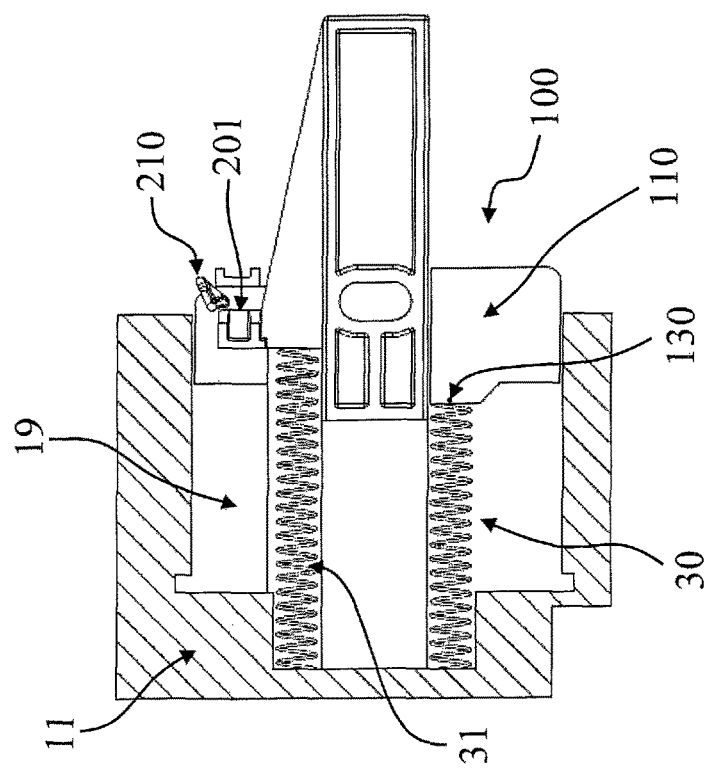
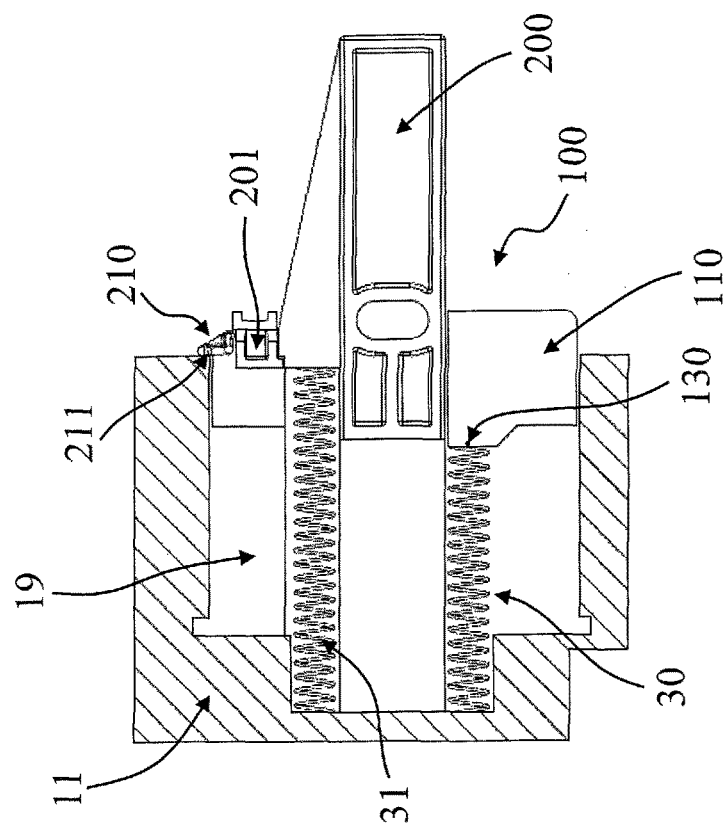
Fig. 8
Fig. 7

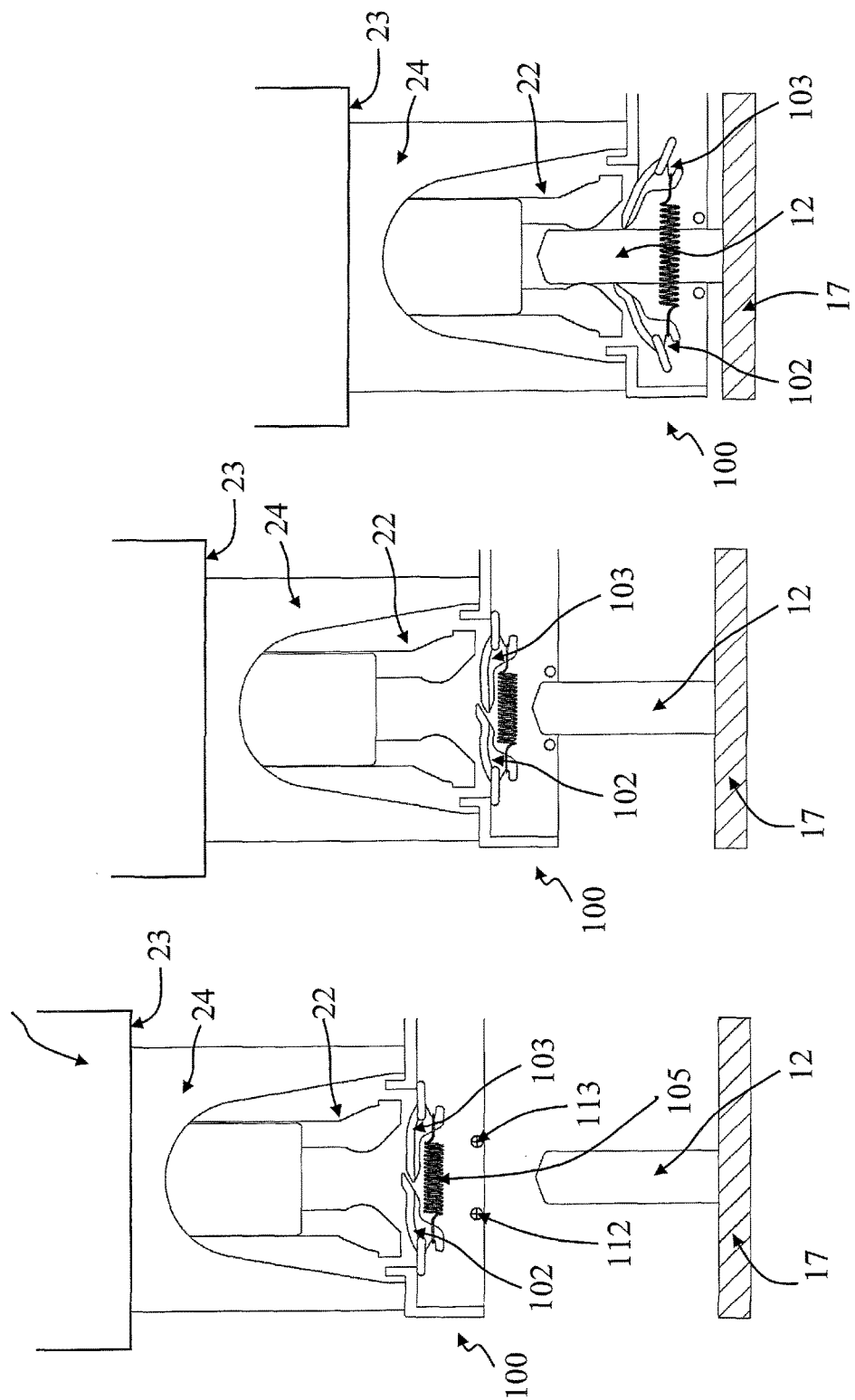

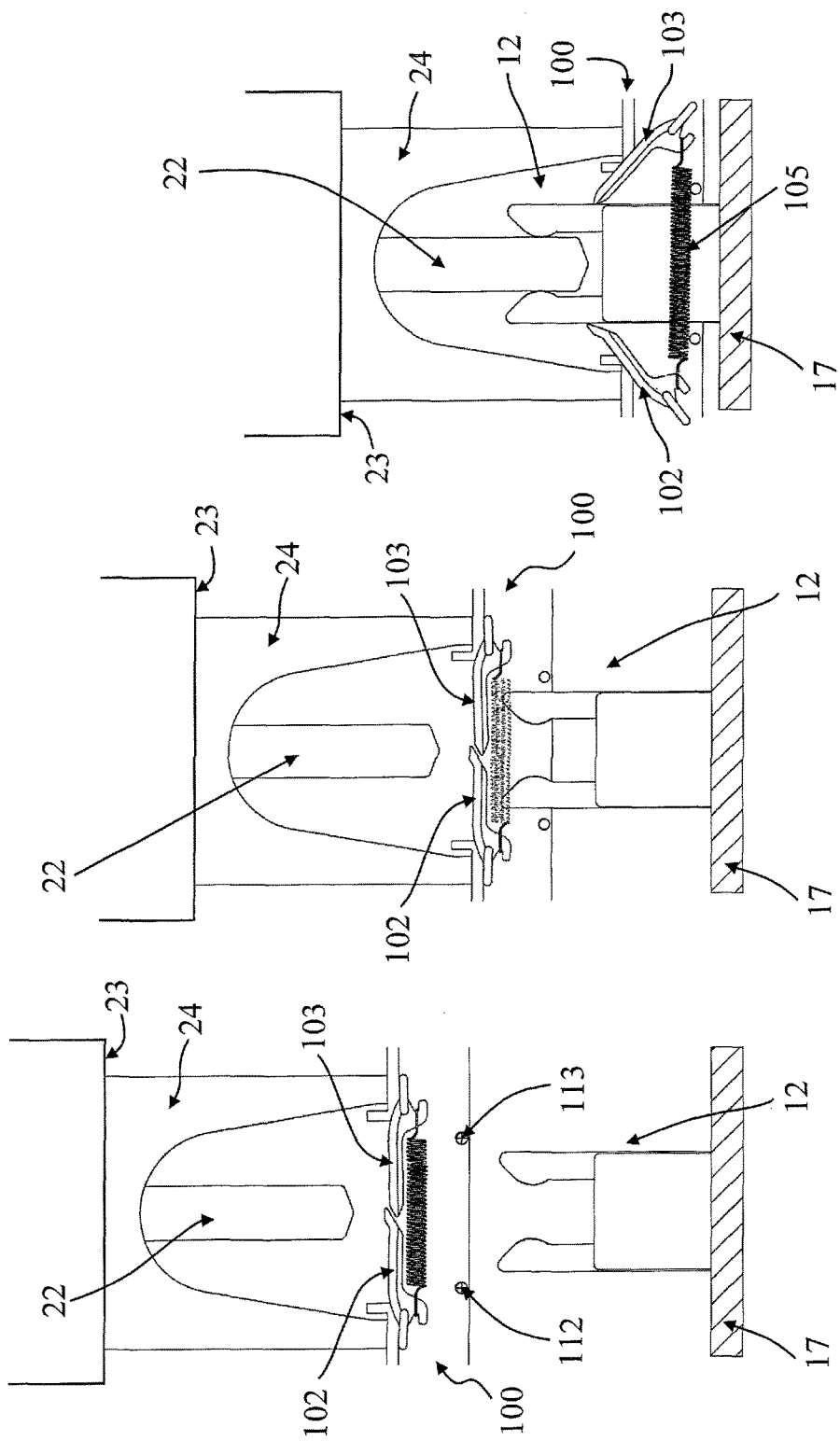

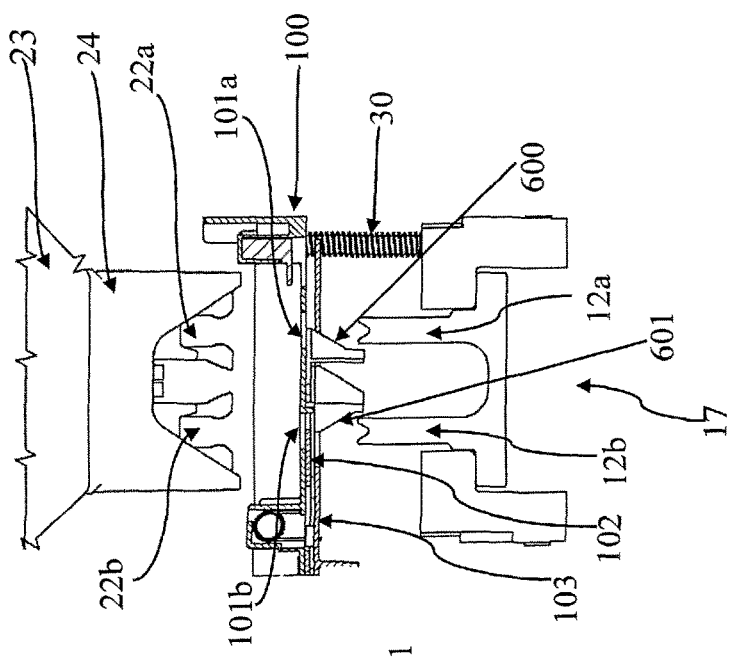
Fig. 24
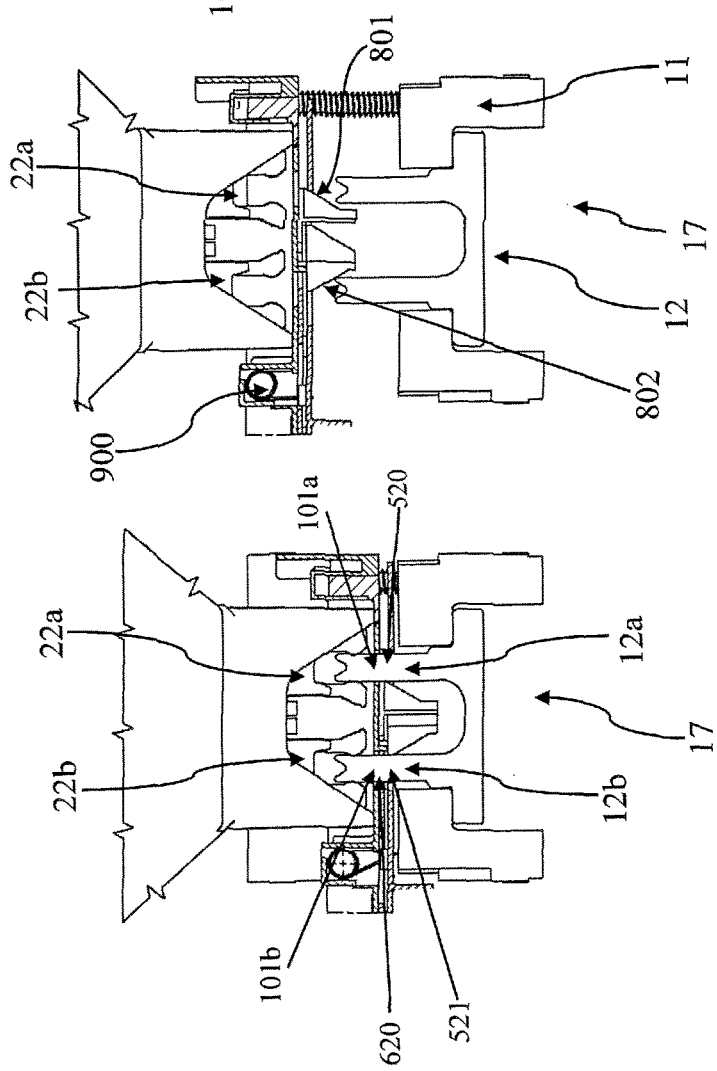
Fig. 25
Fig. 26

ASSEMBLY FOR A WITHDRAWABLE SWITCHING DEVICE AND RELATED SWITCHING DEVICE

The present invention relates to an assembly for a low voltage withdrawable switching device.

As known, switching devices used in low voltage electrical circuits, i.e. circuits with application voltages lower than 1 kV AC and 1.5 kV DC, typically circuit breakers, disconnectors and contactors, are devices designed to allow the correct operation of specific parts of the electric circuits in which they are installed, and of the associated electric loads.

A low voltage switching device comprises a switching unit having a main casing which houses one or more electric poles, or phases, each one comprising at least one movable contact and a corresponding fixed contact.

A driving mechanism causes the actuation of the movable contacts between a closed position, where they are coupled to the corresponding fixed contacts, and an open position, in which they are spaced away from the corresponding fixed contacts.

As known, a switching device can be used in a fixed configuration (fixed switching device), i.e. with the main casing permanently fixed to a cabinet support in its installation position, or in a withdrawable configuration (withdrawable switching device), i.e. with the switching unit operatively associated to a corresponding assembly which is also part of the withdrawable switching device.

In particular, such assembly comprises a supporting frame into/from which the switching unit can be inserted/withdrawn. The insertion/withdrawn of the switching unit to/from the supporting frame is generally assisted by a guiding mechanism, using a crank.

The assembly further comprises one or more first connectors which are adapted to be operatively connected to distribution means of the electrical circuit, such as bus bars, when the assembly is connected to a cabinet support according to its installation position.

The first connectors protrude from a bottom portion of the supporting frame, in such a way to be also adapted for coupling with corresponding second connectors of the switching unit, when the switching unit reaches a connected, or inserted, position into the supporting frame.

The switching unit can further be at least in:
a disconnected, or extracted, position where the switching unit is positioned relative to the supporting frame n such a way that no electrical connection is established between components and/or elements of the switching unit itself and of the corresponding assembly; and
a test position where the switching unit is positioned relative to the supporting frame in such a way that there is not jet a connection between the first and second connectors, but there is an electrical connection between other components or elements of the switching unit itself and the corresponding assembly, in order to perform control and/or testing functionalities.

In order to guarantee an adequate safety for an operator, the assembly for the switching unit further comprises one or more shutter assemblies operatively associated to its first connectors.

In known solutions, each one of the shutter assemblies is fixedly mounted into the supporting frame to provide an insulating barrier against an access by the operator to the corresponding first connectors placed at the bottom portion of the supporting frame.

The shutter assembly comprises, for each associated first connector, an opening allowing the coupling between the first connector and the corresponding second connector of the switching unit under insertion in the supporting frame.

For example, according to a known solution, the shutter assembly comprises a first, fixed, cover member having one or more first through holes aligned with corresponding first connectors, and a second, sliding, cover member having also one or more second through holes.

The second cover member can slide between an open position and a cover position. In the open position, the second through holes are aligned with corresponding first through holes to provide accesses for the coupling between the first and second connectors. In the cover position, the second through holes are offset with respect to and cover the first through holes, so as the accesses towards the first connectors are covered.

Various known shutter mechanisms are adapted to be connected to the second cover member and to operatively interact with the switching unit under insertion into the frame, for sliding the second cover member from the cover position to the open position.

These shutter mechanisms are bulky and, due to high mechanical stress and friction forces, could be damaged during their operation or could not duly perform their tasks.

For improving the safety of the operators, the sliding of the second cover member from the cover position to the open position has to occur when the switching unit is adequately close to the shutter assembly itself, generally after that the switching unit has passed through the test position.

However, there is also the need of waiting the conclusion of the full operation by the shutter mechanism; in this way, the second connectors can find the first and second through holes of the first and second cover members completely aligned to each other, when they have to cross the shutter assembly for coupling to the first connectors.

To this aim, a safety distance is provided, e.g. between the test position and the shutter assembly, which extends the path traveled by the switching unit into the supporting frame to reach its connected position; this means an increasing in the overall depth of the supporting frame.

Furthermore, considering the withdrawing of the switching unit from the supporting frame, the guiding mechanism introduces a mechanical clearance which can offset the predicted position of the switching unit in its withdrawn position from the connected position.

Hence, the above mentioned safety distance has to be further extended in order to avoid that the sliding of the second cover member from the open position to the cover position can occur while the second connectors are still passing through the aligned first and second through holes.

The safety distance is further increased in the case that, according to relevant normative, the second connectors of the switching units comprise claws.

In light of above, at the current state of the art, although known solutions perform in a rather satisfying way, there is still reason and desire for further improvements.

Such desire is fulfilled by an assembly for a withdrawable switching device which is adapted to be installed in a low voltage electrical circuit. The assembly comprises:
a supporting frame into which a switching unit of the withdrawable switching device can be inserted and from which the switching unit can be withdrawn;
at least one first connector placed at and protruding from a bottom portion of the supporting frame, which is adapted to be coupled with a corresponding second connector of the switching unit when the switching unit reaches a connected position into the supporting frame.

The assembly further comprises a shutter assembly comprising:

an opening for allowing the coupling between the first connector and the corresponding second connector, and at least one cover member which is adapted to be moved from a cover position to an open position so as to make the opening accessible for the coupling between the first connector and the corresponding second connector.

The at least one cover member is adapted to be moved from the cover position to the open position by the first connector. The shutter assembly is operatively mounted movable into the supporting frame. The shutter assembly is adapted to operatively interact with the switching unit under insertion into the supporting frame so as to be moved towards the bottom portion for causing the movement of the at least one cover member from the cover position to the open position by the first connector.

Another aspect of the present disclosure is to provide a withdrawable switching device adapted to be installed in a low voltage electrical circuit; this withdrawable switching device comprises an assembly, as the assembly defined in the annexed claims and disclosed in the following description, and a switching unit which can be inserted into/withdrawn from the supporting frame of the assembly.

Further characteristics and advantages will become more apparent from the description of some preferred but not exclusive embodiments of the assembly and related withdrawable switching device according to the disclosure, illustrated only by way of non-limiting examples with the aid of the accompanying drawings, wherein:

FIGS. 7 and 8 are two sectional lateral views of a portion of the assembly illustrated in FIG. 2, wherein such portion comprises a shutter assembly and associated locking means which are illustrated in FIGS. 7 and 8 in two different positions;

FIGS. 9-11 illustrate: a rear portion of a first switching unit, a portion of the shutter assembly illustrated in FIGS. 5 and 6, and a connector of a first assembly for a withdrawable circuit breaker, wherein FIGS. 9, 10 and 11 correspond to the first switching unit in its disconnected, test and connected position, respectively;

FIGS. 12-14 illustrate: a rear portion of a second switching unit, a portion of the shutter assembly illustrated in FIGS. 5 and 6, and a connector of a second assembly for a withdrawable circuit breaker, wherein FIGS. 12, 13 and 14 correspond to the second switching unit in its disconnected, test and connected position, respectively;

FIGS. 24-26 illustrate: a rear portion of a third switching unit, a portion of the shutter assembly illustrated in FIGS. 19 and 20, and a connector of a third assembly for a withdrawable circuit breaker, wherein FIGS. 24, 25 and 26 correspond to the third switching unit in a disconnected position, an intermediate position, and a connected position, respectively;

Figure 27:
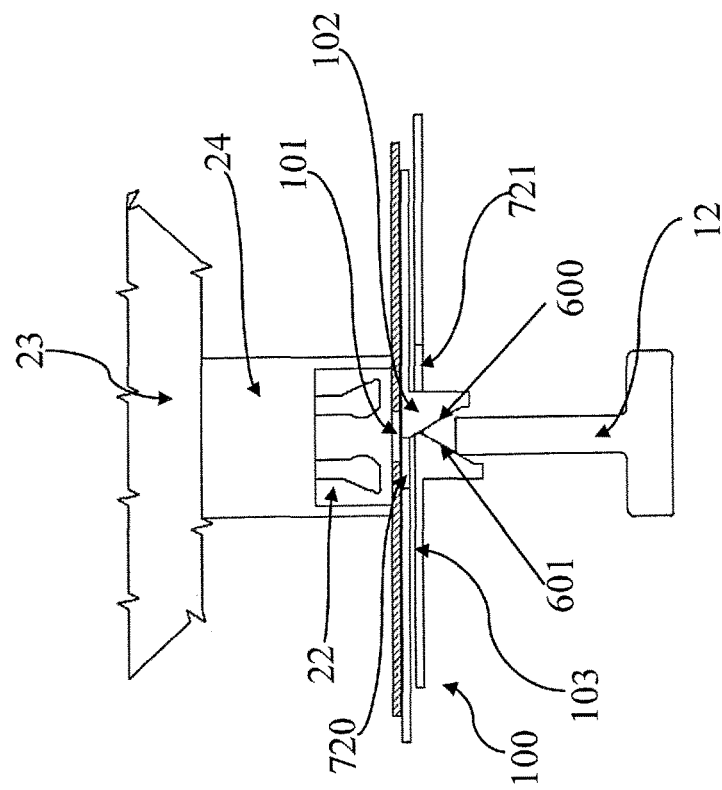
Figure 28:
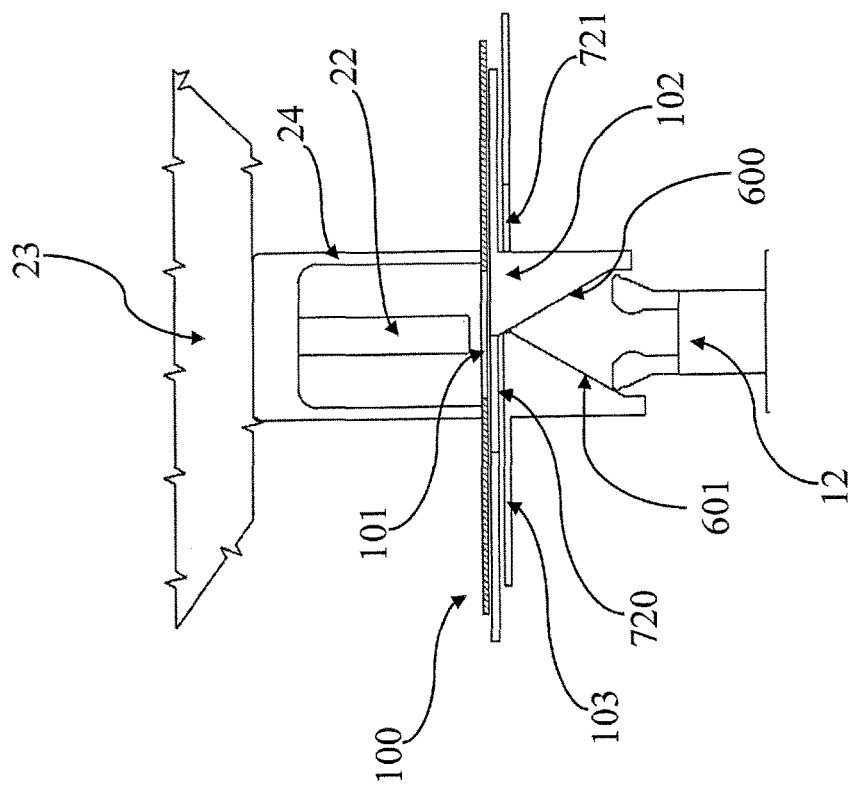

FIG. 27 illustrate a rear portion of a fourth switching unit, a portion of a third exemplary shutter assembly, and a connector of a fourth assembly for a withdrawable circuit breaker, wherein the fourth switching unit is in a disconnected position; and FIG. 28 illustrated a rear portion of a fifth switching unit, a portion of a fourth exemplary shutter assembly, and a connector of a fifth assembly for a withdrawable circuit breaker, wherein the fifth switching unit is in a disconnected position.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped" is used herein while referring to any component as a whole, or to any part of a component, or to a whole combinations of components, or even to any part of a combination of components, it has to be understood that it means and encompasses correspondingly either the structure, and/or configuration and/or form and/or positioning of the related component or part thereof, or combinations of components or part thereof, such term refers to.

Finally, the term transversal or transversally hereinafter used encompasses a direction non-parallel to the element or direction it is related to, and perpendicularity has to be considered a specific casing of transverse direction.

With reference to above cited figures, the present disclosure is related to an assembly 10 for a withdrawable switching device 1 adapted to be installed in a low voltage electrical circuit.

Figure 1:
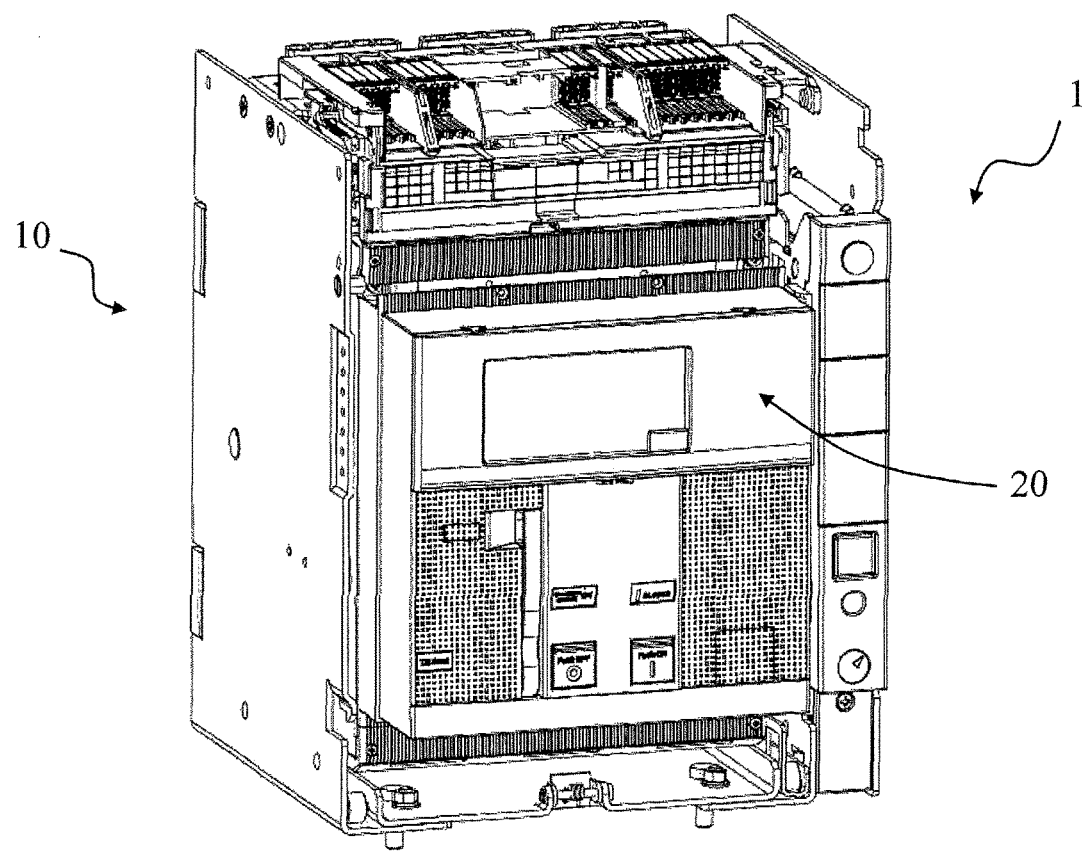
FIG. 1 is a perspective view of a withdrawable circuit breaker according to the present disclosure.
Figure 2:
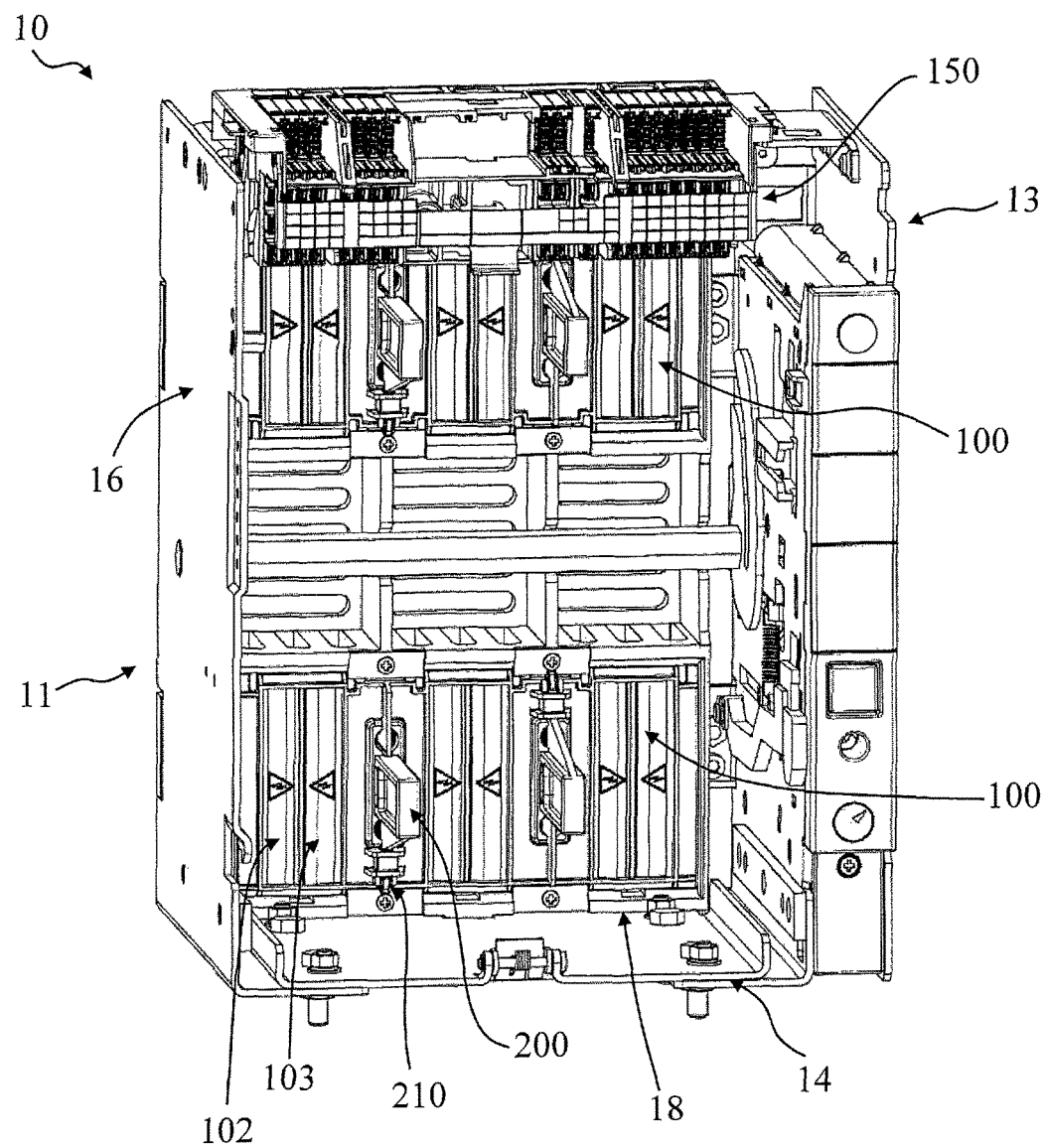
FIG. 2 is a front perspective view of a first exemplary assembly which can be used for the withdrawable circuit breaker illustrated in FIG. 1.
Figure 4:
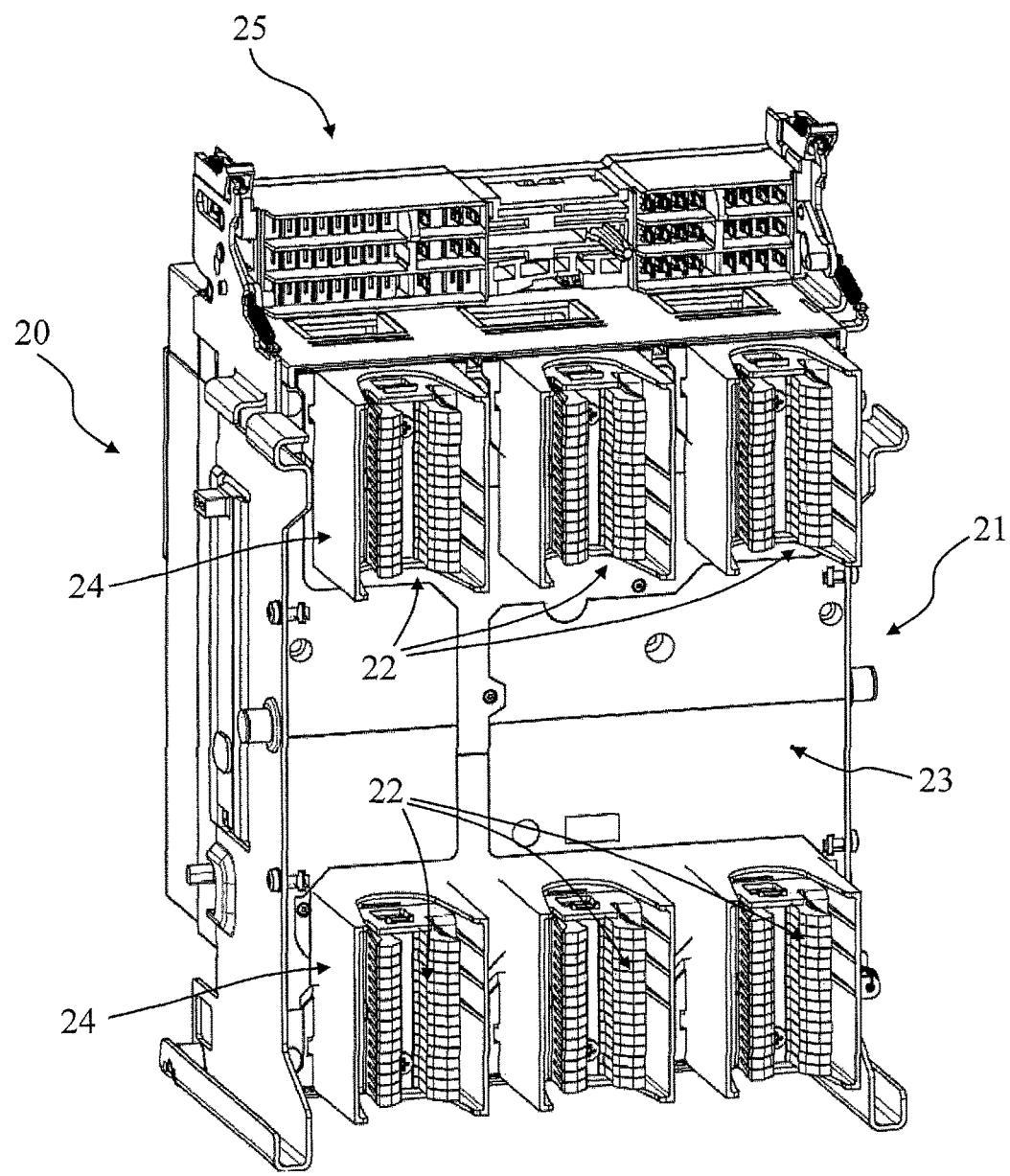
FIG. 4 is a rear perspective view of a first exemplary switching unit which can be used for the withdrawable circuit breaker illustrated in FIG. 1.

For example, the switching device 1 illustrated in FIG. 1 is a withdrawable circuit breaker 1 which comprises the exemplary assembly 10 illustrated in FIG. 2 and the exemplary switching unit 20 illustrated in FIG. 4, which are associable to each other.

Figure 16:
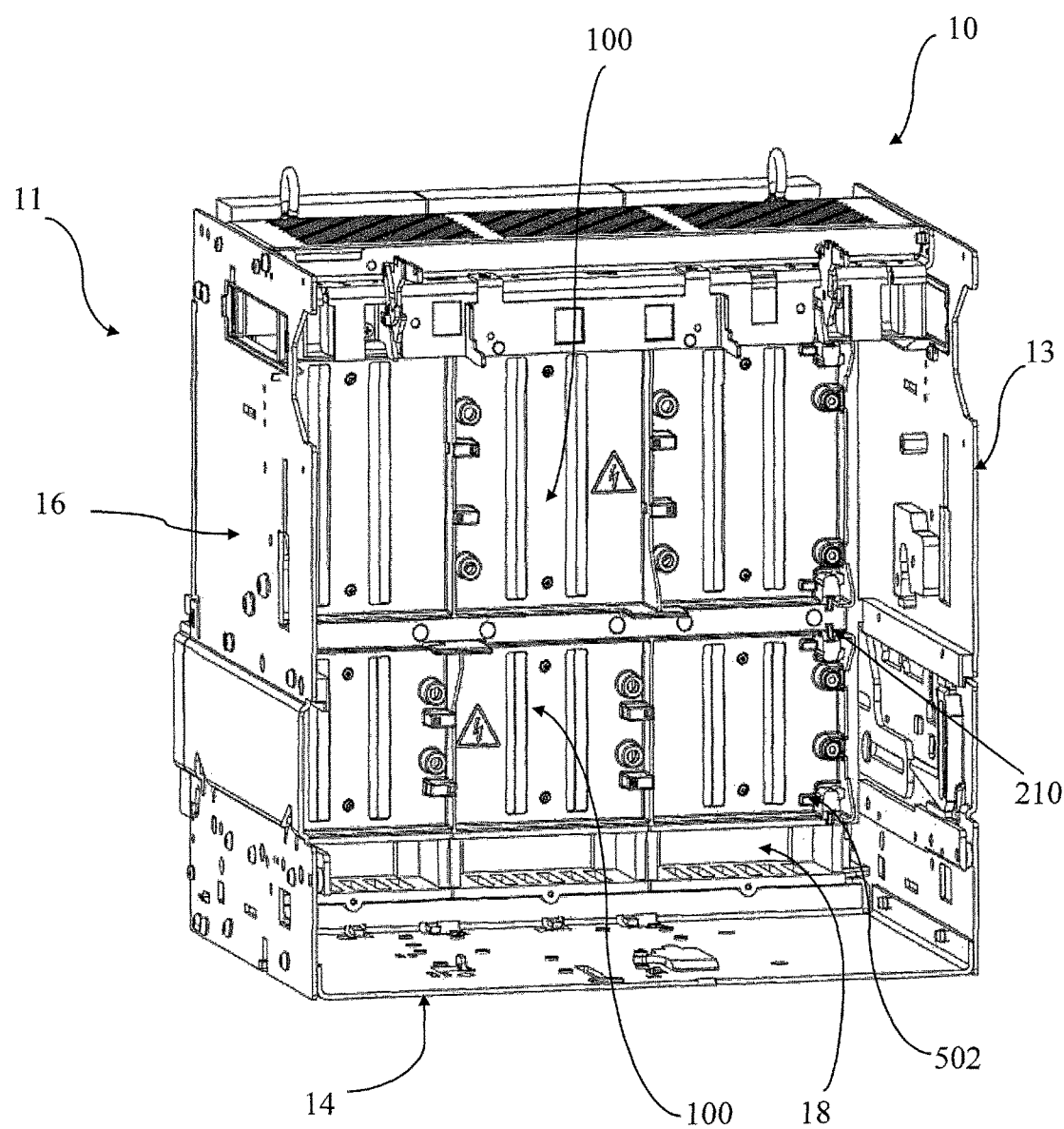
FIG. 16 is a front perspective view of a second exemplary assembly which can be used for a withdrawable circuit breaker.
Figure 18:
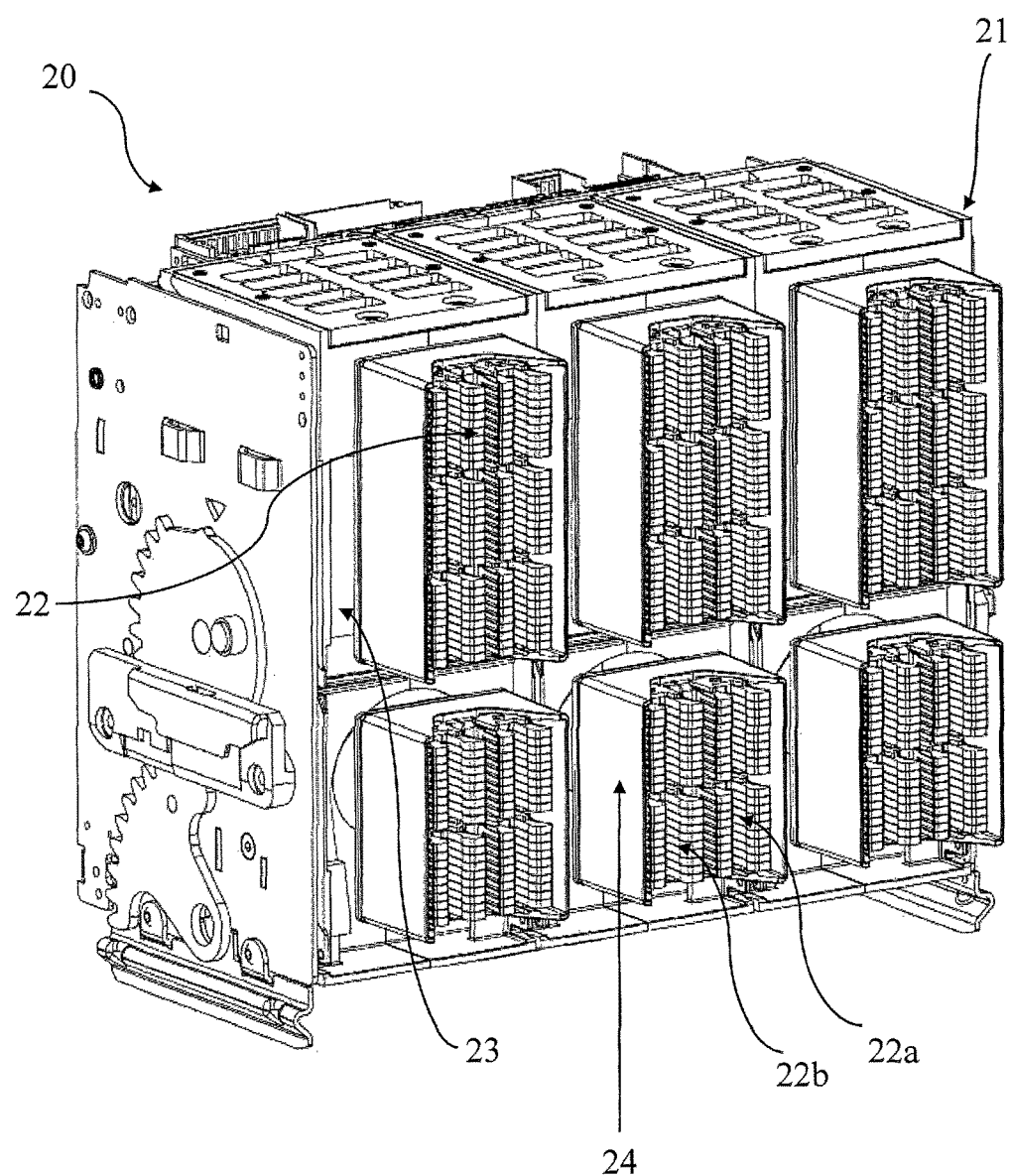
FIG. 18 is a rear perspective view of a second exemplary switching unit which can be used for a withdrawable circuit breaker.

For example, the assembly 10 illustrated in FIG. 16 and the switching unit 20 illustrated in FIG. 18 are associable to each other for realizing another exemplary withdrawable circuit breaker 1.

Even if the exemplary assemblies 10 are particularly referred to their use in a withdrawable circuit breaker 1, the assembly 10 according to the present disclosure can be also used for other types of withdrawable switching devices 1, such as disconnectors or contactors.

The switching unit 20 comprises a main casing 21, preferably made at least partially of insulating material. According to well known solutions, hence not disclosed herein in detail, in order to perform its switching tasks the unit 20 comprises, accommodated into the main casing 21, one or more electric poles, or phases, each one comprising at least one movable contact and a corresponding fixed contact (not viewable in the attached figures). The main casing 21 further houses a driving mechanism (also not viewable in the attached figures) for causing the actuation of the movable contacts between a closed position, where they are coupled to the corresponding fixed contact to realize a conductive current path, and an open position, in which they are spaced away from the corresponding fixed contacts for interrupting the conductive current path.

The switching unit 20 further comprises one or more connectors 22 which are operatively associated to its electrical poles; in the exemplary embodiments illustrated in FIGS. 4 and 18 the connectors 22 protrude from a rear portion 23 of the main casing 21. In particular, each of the connectors 22 illustrated in FIG. 4 comprises a claw 22, while each of the connectors 22 illustrated in FIG. 18 comprises a pair of claws 22a, 22b.

The assembly 10 according to the present disclosure comprises a supporting frame 11 into which the corresponding switching unit 20 can be inserted, and from which the switching unit 20 can be withdrawn. In other words, the switching unit 20 and the supporting frame 11 are substantially a movable part and a corresponding fixed part, respectively, of the withdrawable switching device 1. Preferably, a guiding mechanism is used for performing the inserting/withdrawn operations; this guiding mechanism is well known in the art and, hence, no further herein disclosed.

In the exemplary but not limiting embodiments illustrated in FIGS. 2-3 and 16-17, the supporting frame 11 comprises at least two metal flanks 13 and 16 linked by a base 14 and by a rear wall 15 which is preferably made of insulating material. The elements 13, 14, 15 and 16 are connected to each other to define an internal volume for receiving the switching unit 20 through a frontal access 18.

The assembly 10 according to the present disclosure further comprises one or more connectors 12 placed at a bottom portion 17 of its supporting frame 11; in particular, the connectors 12 protrude from the bottom portion 17.

The connectors 12 are adapted to be operatively connected to distribution means of the electrical circuit into which the switching device 1 is installed. For example, the connectors 12 are adapted to be operatively connected to busbars, when the assembly 10 is mounted on a cabinet support according to its installation position.

The connectors 12 are further adapted to be coupled with corresponding connectors 22 of the switching unit 20, when such switching unit 20 reaches a connected, or inserted, position into the supporting frame 11. In this way, an electrical connection can be established between the distribution means of the electrical circuit and the poles of the switching unit 20, through the coupling between the connectors 12 and the corresponding connectors 22.

For example, FIG. 11 illustrates a claw connector 22 of the switching unit 20 in the connected position; such claw connector 22 clamps the pin-shaped connector 12 protruding transversally from the corresponding bottom portion 17 of the supporting frame 11.

According to another example, the switching unit 20, instead of the claw connectors 22, comprises substantially pin-shaped connectors 22. Accordingly, each connector 12 comprises a claw 12 which transversally protrudes from the corresponding bottom portion 17 of the supporting frame 11. As illustrated in FIG. 14, this claw connector 12 is adapted to clamp the corresponding pin-shaped connector 22, when the switching unit 20 is in the connected position.

According to the example illustrated in FIG. 18, the switching unit 20 comprises connectors 22 each having a couple of claws 22a, 22b. Accordingly, each connector 12 comprises two blades 12a, 12b which transversally protrude from the corresponding bottom portion 17 of the supporting frame 11. As illustrated for example in FIG. 26, each one of the blades 12a, 12b is adapted to be inserted in one of the claws 22a, 22b of the corresponding connector 22, when the switching unit 20 reaches the connected position.

As disclosed above, the switching unit 20 can be withdrawn from the supporting frame 11 in order to reach a disconnected, or extracted, position. In this disconnected position the switching unit 20 is positioned relative to the supporting frame 11 such that no electrical connection is established between components and/or elements of the switching unit itself 20 and of the assembly 10. In particular, the connectors 12 and 22 are separated from each other, as illustrated for example in FIGS. 9, 12, 24, 27 and 28.

Preferably, the switching unit 20 can be also in a test position between the connected and the disconnected positions, as illustrated for example in FIGS. 10 and 13. In this test position the switching unit 20 is positioned relative to the supporting frame 11 in such a way that the connectors 12 and 22 are separated, but an electrical connection can be established between other components or elements of the switching unit 20 itself and of the assembly 10.

For example, in the test position a connection can be established between one or more auxiliary and/or accessory devices housed into or connected to the main casing 21 and one or more auxiliary and/or accessory devises associated to the supporting frame 11. This connection can occur by means of a connection board 25 on the main casing 21 and a corresponding connection board 150 on the supporting frame 11.

The assembly 10 according to the present disclosure comprises at least one shutter assembly 100 which is associated to one or more corresponding connectors 12.

In particular, for each corresponding connector 12, the shutter assembly 100 comprises:

an opening 101 for allowing the coupling between the connector 12 and the corresponding connector 22 of the switching unit 20; and at least one cover member 102, 103 which can be moved from a cover position to an open position to make the opening 101 accessible for the coupling between the connectors 12 and 22.

In other words, the at least one cover member 102, 103 can be moved away from the cover position, in which it covers the opening 101, towards the open position in which the opening 101 is accessible for the coupling between the connectors 12 and 22.

In practice, according to the exemplary embodiments illustrated in the attached figures, the at least one shutter assembly 100 is operatively mounted into the supporting frame 11, between the bottom portion 17 and the access 18, so as to provide a safety barrier towards the corresponding connectors 12.

Preferably, the at least one cover member 102, 103 is made of insulating material, and more preferably the whole shutter assembly 100 is made of insulating material.

Advantageously, the at least one cover member 102, 103 associated to each opening 101 of the shutter assembly 100 is adapted to be moved from the cover position to the open position by a corresponding connector 12 which protrudes from the bottom portion 17 of the supporting frame 11.

In other words, the connector 12 itself is adapted to cause the movement of the corresponding at least one cover member 102, 103 from the cover position to the open position, in order to reach and couple with the corresponding connector 22 through the opening 101.

The shutter assembly 100 is operatively mounted movable into the supporting frame 11, and it is adapted to operatively interact with the switching unit 20 under insertion into the supporting frame 11 so as to be moved towards the bottom portion 17, for causing the movement of the at least one cover member 102, 103 from the cover position to the open position by the corresponding connector 12.

In practice, the shutter assembly 100 remains in a starting position, where the at least one cover member 102, 103 associated to each opening 101 is in its cover position, until it is moved towards the bottom portion 17 by an operative interaction with the switching unit 20 also moving towards the bottom portion 17. Due to this movement of the shutter assembly 100 towards the bottom portion 17, the connector 12 can directly act an opening action on the corresponding at least one cover member 102, 103.

Having the connector 12 itself causing the movement of the at least one cover member 102, 103 from the cover position to the open position means that this opening movement advantageously occurs when the switching unit 20 is near to its connected position. For example, with reference to FIGS. 9-11, 12-14, and 24-26 the opening movement of the at least one cover member 102, 103 can occur after that the switching unit 20 has passed through the test position.

Preferably, at least one elastic element 30 is operatively connected to the supporting frame 11 and to the shutter assembly 100, in such a way to be compressed by the shutter assembly 100 moving towards the bottom portion 17. In this way, when the switching unit 20 is extracted from the connected position to the disconnected position, the at least one elastic element 30 causes a return of the shutter assembly 100 in its starting position. During this returning movement, contact is lost between the connector 12 and the corresponding at least one cover member 102, 103 which, hence, can return in its initial cover position.

Preferably, the shutter assembly 100 is adapted to be pushed towards the bottom portion 17 by the switching unit 20 under insertion into the supporting frame 11 for reaching its connected position. For example, the switching unit 20 illustrated in FIGS. 4 and 18 comprises, for each of its connectors 22, a pushing element 24 which protrudes from its rear portion 23. The pushing elements 24 are adapted to contact and push the shutter assembly 100 towards the bottom portion 17, during the insertion of the switching unit 20 into the supporting frame 11.

Preferably, the pushing elements 24 surrounds at least laterally the corresponding connectors 22.

Preferably, the shutter assembly 100 is adapted to be contacted by the switching unit 20 when the switching unit 20 itself is in the disconnected position. For example, in FIGS. 9 and 12 the illustrated pushing element 24 is in contact with the corresponding shutter assembly 100, while the switching unit 20 is in the disconnected position. In this way, the pushing element 24 can start its pushing action on the shutter assembly 100 as soon as the switching unit 20 moves away from the disconnected position, towards the bottom portion 17.

This is advantageous because, during the movement of the switching unit 20 from the disconnected position towards the test or connected position, the pushing element 24 provides an additional electrical segregation and an additional mechanical protection around the opening 101, the cover members 102, 103, and the live parts represented by the connector 22 and the corresponding connector 12.

According to the exemplary embodiments illustrated in the cited figures, the at least one cover member 102, 103 associated to each opening 101 of the shutter assembly 100 comprises a first cover member 102 and a second cover member 103. The first and second cover members 102, 103 are adapted to be moved by the corresponding connector 12 from their cover position, where they cover the opening 101, to their open position, when they provide access to the opening 101 for the coupling between the connectors 12 and 22.

For example, the first and second cover members 102 and 103 are adapted to be moved by the connector 12 from their cover position, where they are adjacent to each other so as to cover the opening 101, to their open position, where they are separated from each other so as to make the opening 101 accessible for the coupling between the connectors 12 and 22.

According to the exemplary embodiments illustrated in FIGS. 9-11, the first and second cover members 102 and 103 are adapted to be moved from their cover position to their open position by the insertion between them of the corresponding connector 12, insertion which is due to displacement of the overall shutter assembly 100 towards the bottom portion 17 from which the connector 12 itself protrudes.

Preferably, the first and second cover members 102 and 103 are operatively linked to each other by at least one elastic element 105, such as a spring 105, so as the movement of the first and second cover members 102, 103 from their cover to open position causes an elastic deformation of the elastic element 105. In this way, at the extraction of the switching unit 20 from its connected to its disconnected position, the action of the spring 105 recalls the first and second cover members 102, 103 in their cover position, when contact is lost between the first and second cover members 102, 103 and the corresponding connector 12.

According to a first preferred solution, the first and second cover members 102, 103 are adapted to be rotated by the corresponding connector 12 from their cover position to their open position about a first axis of rotation 112 and a second axis of rotation 113, respectively.

Figure 3:
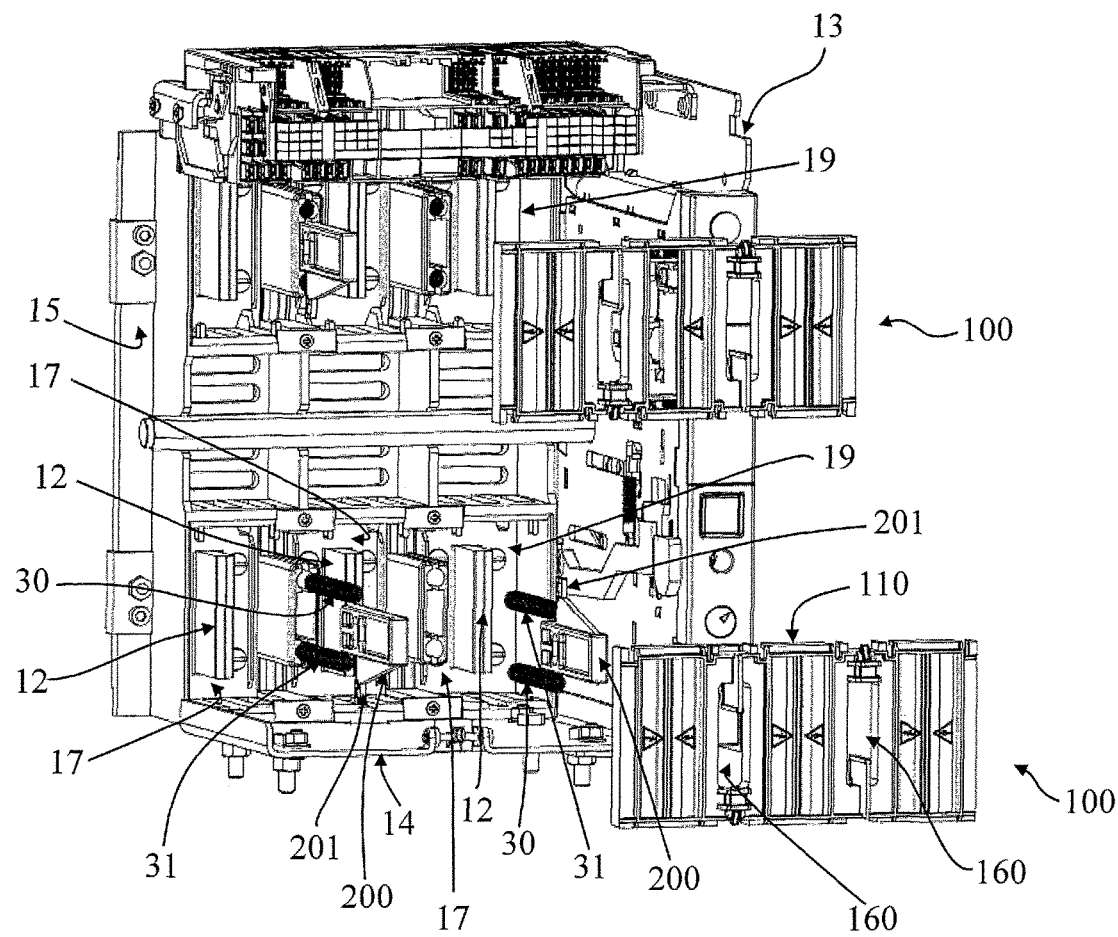
FIG. 3 is an exploded view of some components of the assembly illustrated in FIG. 2.
Figure 5:
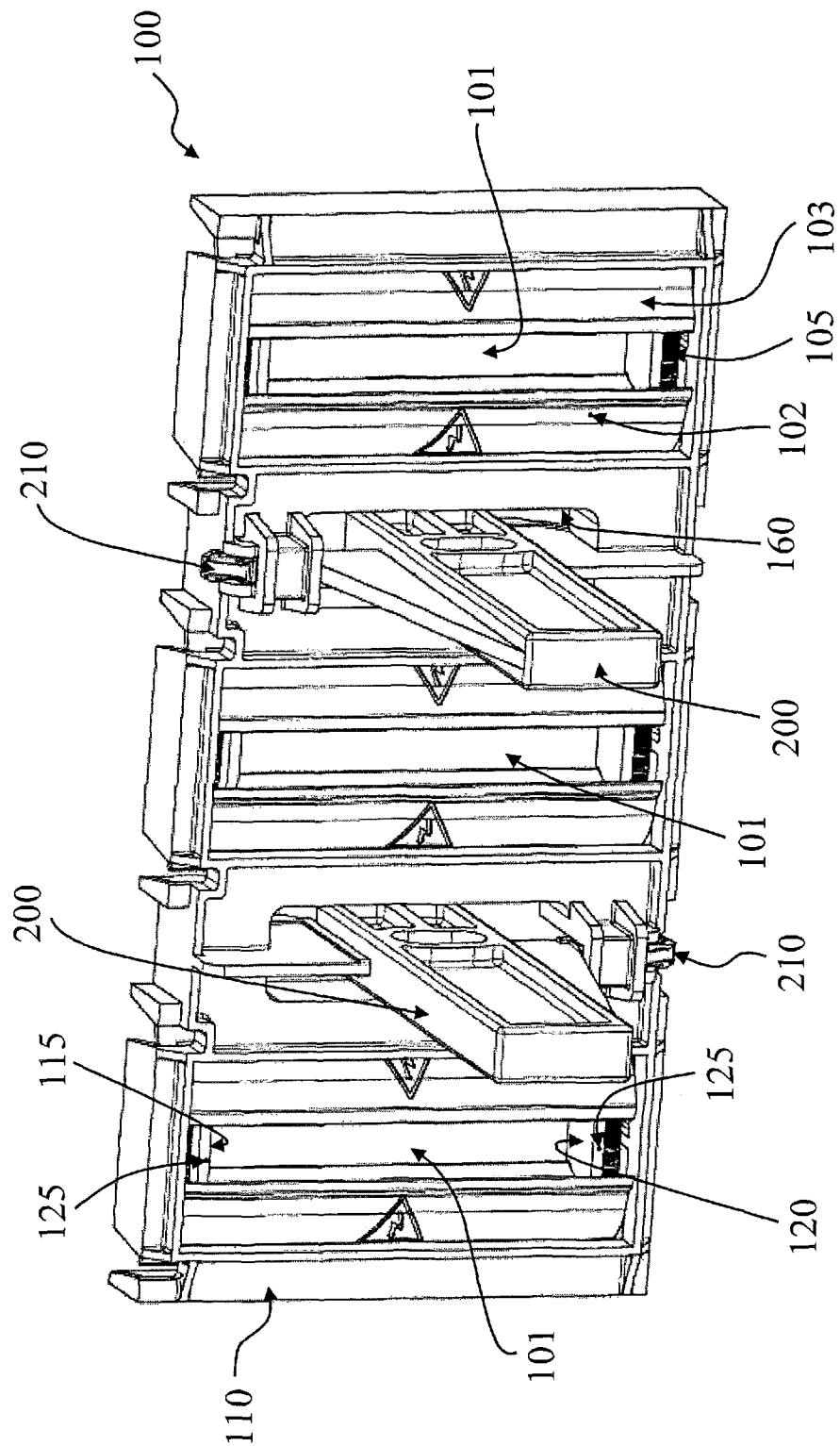
FIGS. 5 and 6 are a front perspective view and a rear perspective view, respectively, of a first exemplary shutter assembly which can be used in the assembly illustrated in FIG. 2.
Figure 6:
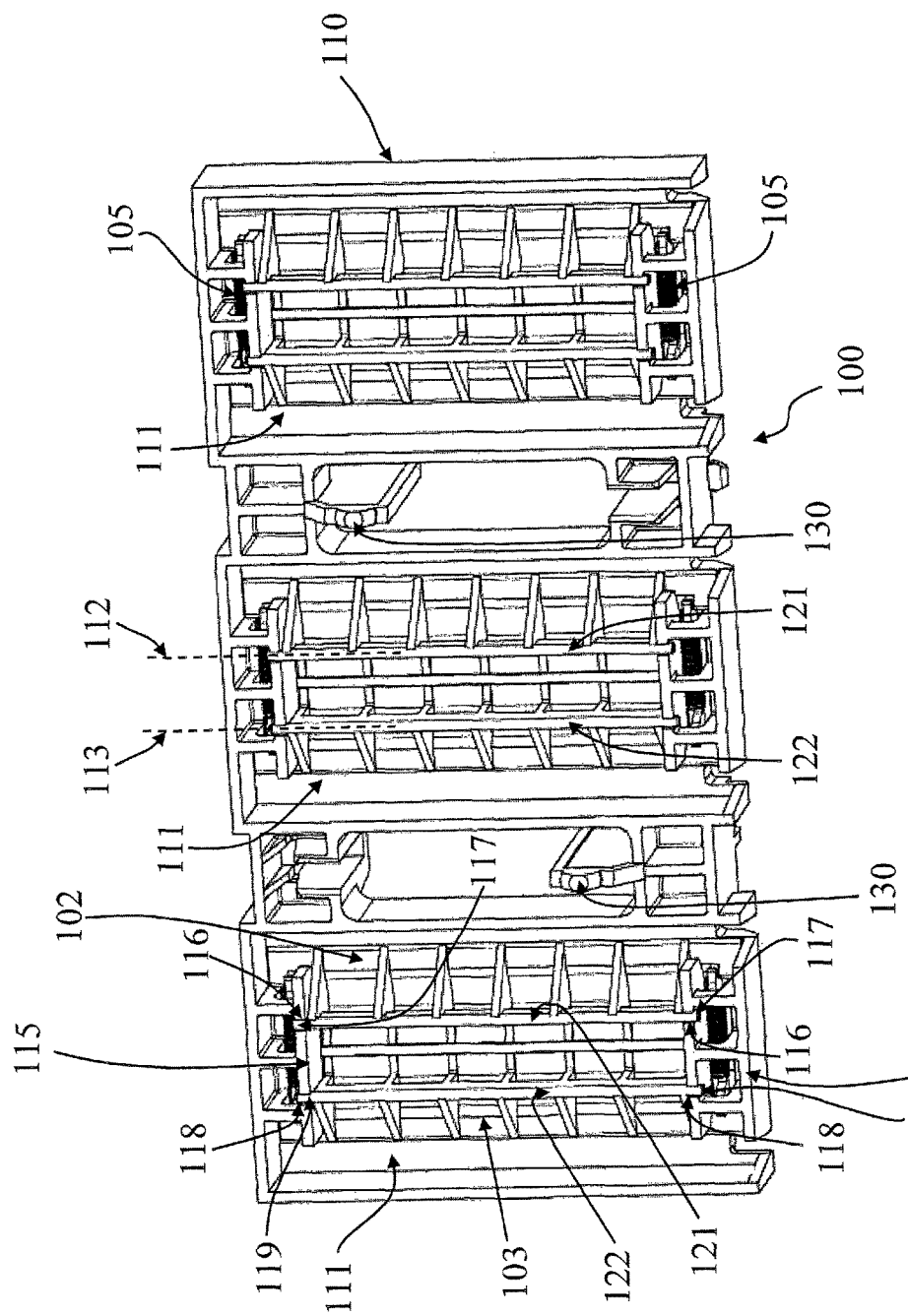

The assembly 10 illustrated for exemplary purposes in FIGS. 2-3 comprises two shutter assemblies 100, as the exemplary shutter assembly 10 illustrated in FIGS. 5 and 6. In particular, such exemplary shutter assembly 100 comprises a frame 110 through which three openings 101 are defined for allowing the coupling between three connectors 12 and three corresponding connectors 22.

Each of the two exemplary shutter assemblies 100 illustrated in FIGS. 2 and 3 is operatively mounted movable into the supporting frame 11, by operatively inserting its frame 110 in a corresponding cavity 19 defined in the supporting frame 11. For example, the bottom portion 17 of each cavity 19 is defined by the rear wall 15, and it comprises through holes from which three connectors 12 protrudes for extending into the cavity 19.

With reference also to FIGS. 7-8, two springs 30 are operatively connected to the supporting frame 11 and to a corresponding surface 130 of each shutter assembly 100, in such a way to be compressed by the shutter assembly 100 moving towards the bottom portion 17.

With reference to the exemplary shutter assembly 100 illustrated in FIGS. 5 and 6, the first and second cover members 102 and 103 associated to each of its openings 101 are pivotally mounted to the frame 110, in such a way to define the first axis of rotation 112 and the second axis of rotation 113.

For example, with reference to FIG. 6, the frame 110 comprises:
- a plurality of cavities 111, each one under a corresponding opening 101;
- a couple of portions 115, 120 extending into each cavity 111, faced and opposed to each other.

Each one of the two portions 115, 120 defines into the corresponding cavity 111:
- a seat 116 for receiving therein a corresponding pin portion 117 of the first cover member 102, so as to define the first axis of rotation 112; and
- a seat 118 for receiving therein a corresponding pin portion 119 of the second cover member 103, so as to define the second axis of rotation 113.

In particular, the first and second cover members 102, 103 illustrated in FIG. 6 preferably comprise a rod 121 and a rod 122, respectively. The opposed ends 117 of the rod 121 are the pin portions 117 inserted into the seats 116 of the portions 115 and 120, while the opposed ends 119 of the rod 122 are the pin portions 119 inserted into the seats 118 of the portions 115 and 120.

With reference to FIG. 5, each of the portions 115, 120 preferably comprises a surface of contact 125 for the first cover member 102 and for the second cover member 103, which is defined between the opening 101 and the seats 116 and 117.

In this way, a movement of the first and second cover members 102, 103 relative to the frame 110, which would cause an exit of the pin portions 117 and 119 from the corresponding seats 116 and 118, is prevented by the contact surfaces 125.

According to a second preferred solution, the first and second cover members 102, 103 are adapted to slide from their cover position, where they are adjacent one to the other for covering the opening 101, to their open position where the opening 101 is accessible. In particular, the first and second cover members 102 and 103 are adapted to be slid from their cover position to their open position by the connector 12, due to the displacement of the overall shutter assembly 100 towards the bottom portion 17 from which the connector 12 itself protrudes.

Preferably, with reference to the exemplary embodiments illustrated in FIGS. 19-21, 27 and 28, the shutter assembly 100 according to the second preferred solution comprises a frame 110 through which at least one opening 101 is defined for each associated connector 12 of the assembly 10.

The first cover member 102 and the second cover member 103 are an upper cover member 102 and a lower cover member 103, respectively, which are operatively slidably mounted on the frame 110.

The upper cover member 102 and the lower cover member 103 are configured so as to cover the associated one or more openings 101 when they are in the cover position, and so as to leave these openings 101 uncovered when they are in the open position.

The upper cover member 102 and the lower cover member 103 are adapted to be slid by the corresponding connector 12, from their cover position to their open position. Preferably, such members 102 and 103 are adapted to by slid by the connector 12 along opposed directions.

Preferably, at least one of the upper and lower cover members 102, 103 comprises a through hole 520-524, 620-624, 720-721 defined in such a way to be aligned with a corresponding opening 110, when said at least one of the upper and lower cover members 102, 103 is in the open position.

Preferably, the upper cover member 102 and the lower cover member 103 comprise one or more first contact surfaces 600 and one or more second contact surfaces 601, respectively, onto which the first connector 12 can slide in such a way to cause the sliding movement of the upper and lower cover members 102, 103 from their cover position to their open position.

Figure 17:
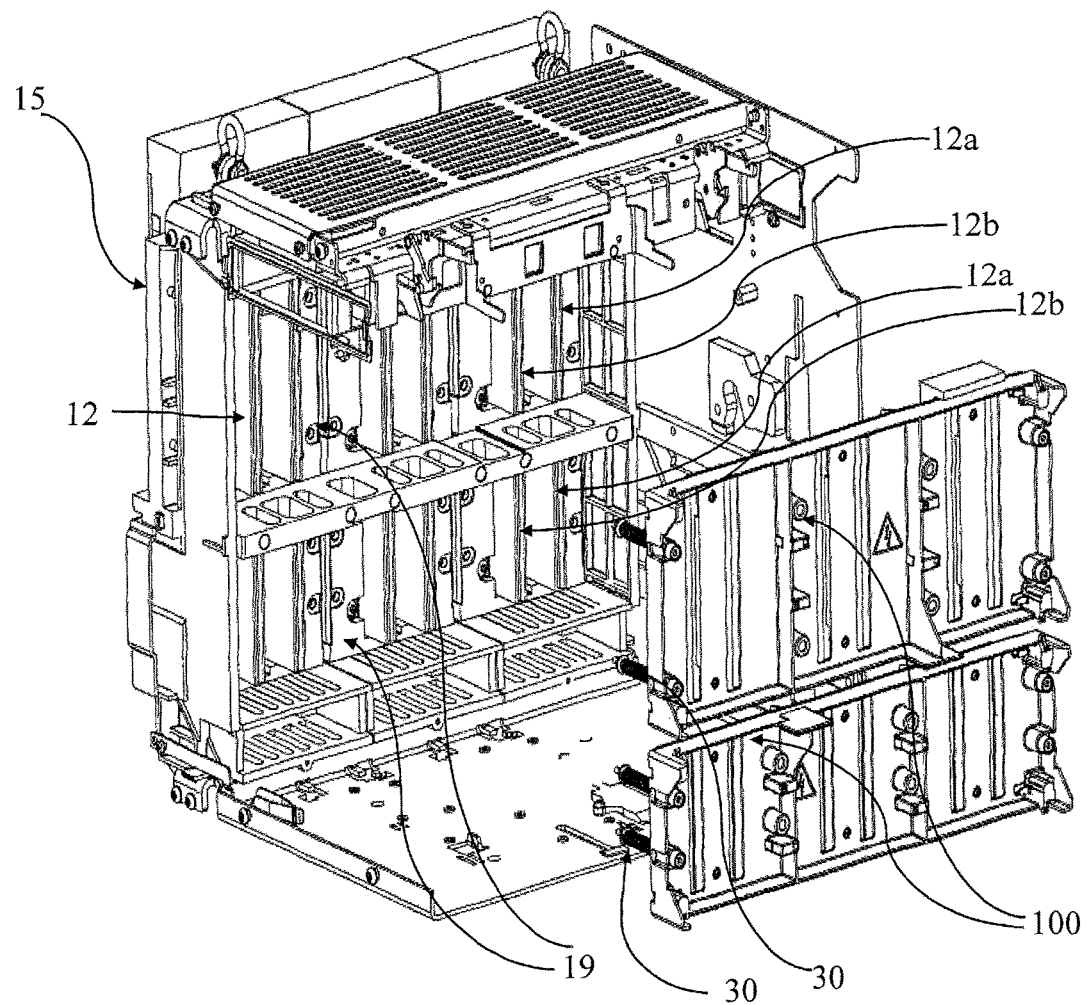
FIG. 17 is an exploded view of some components of the assembly illustrated in FIG. 16.
Figure 19:
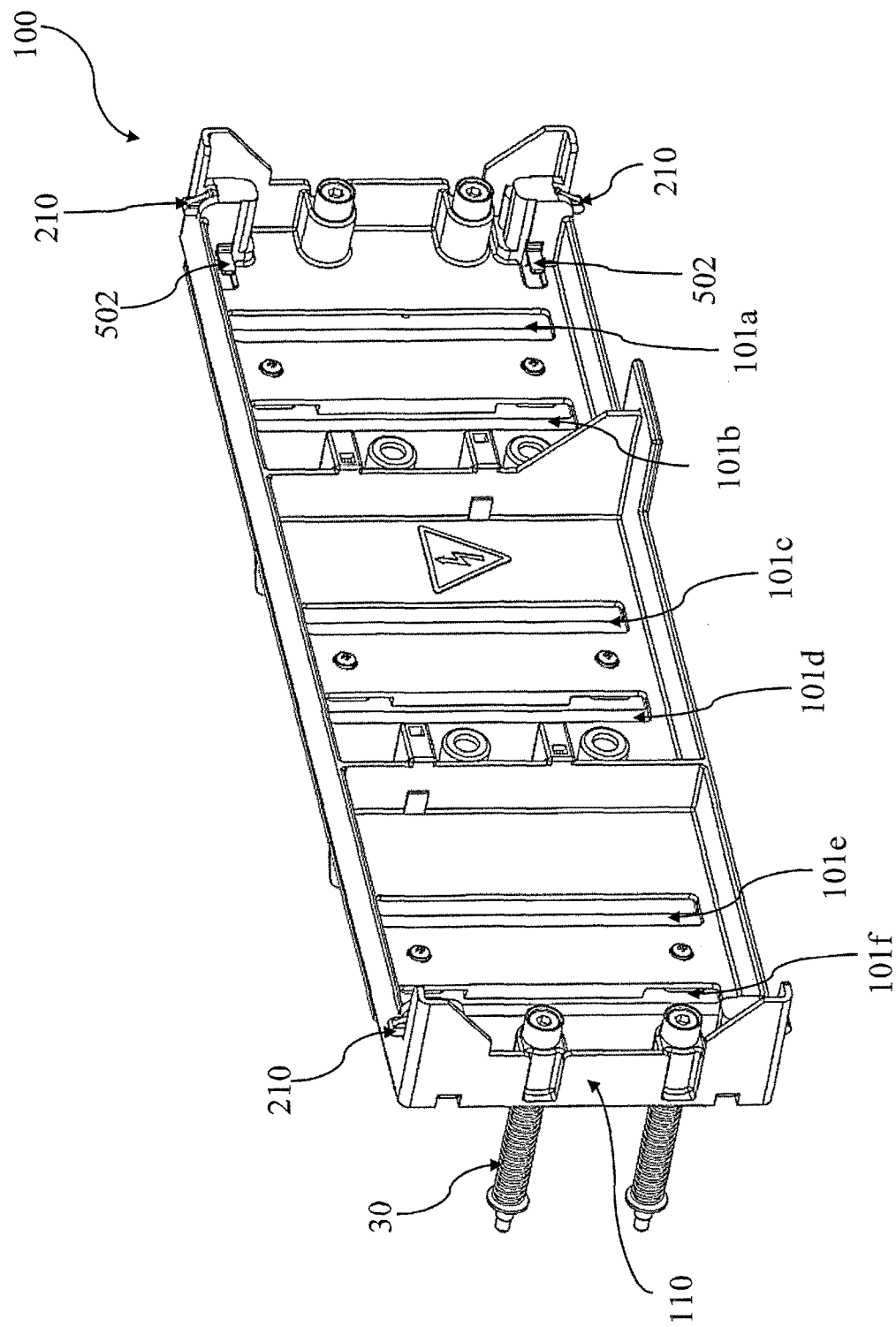
FIGS. 19 and 20 are a front perspective view and a rear perspective view, respectively, of a second exemplary shutter assembly which can be used in the assembly illustrated in FIG. 16.
Figure 20:
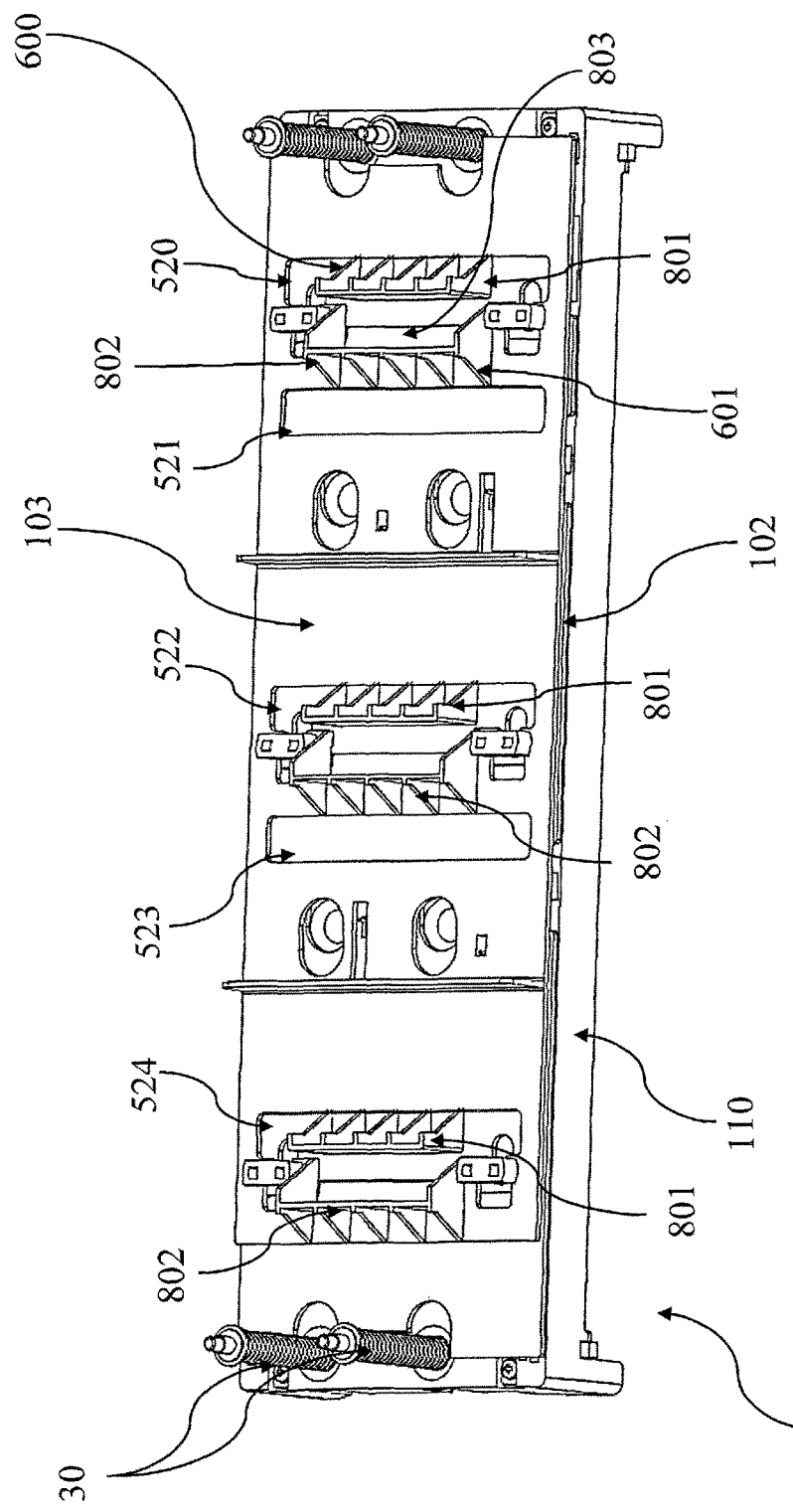
Figure 21:
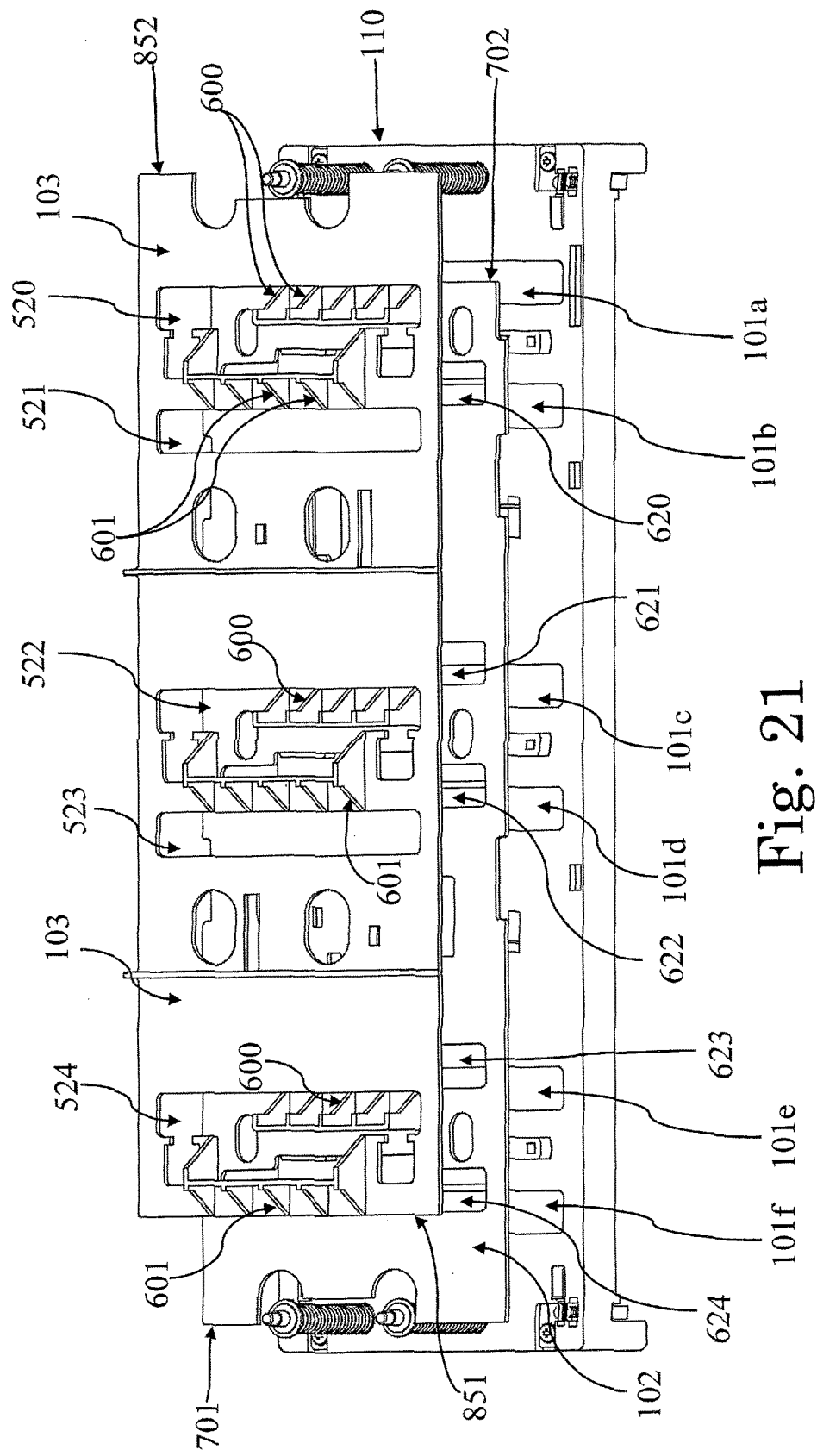
FIG. 21 is an exploded rear view of the shutter assembly illustrated in FIGS. 19 and 20.

The assembly 10 illustrated for example in FIGS. 16-17 comprises two shutter assemblies 100, as the exemplary shutter assembly 10 illustrated in FIGS. 19-21.

Each of the two exemplary shutter assemblies 100 illustrated in FIGS. 16 and 17 is operatively mounted movable into the supporting frame 11, by operatively inserting it in a corresponding cavity 19 defined in the supporting frame 11. For example, the bottom portion 17 of each cavity 19 is defined by the rear wall 15, and it comprises through holes from which three connectors 12 protrudes for extending into the cavity 19.

With reference also to FIG. 17, four springs 30 are operatively connected to the supporting frame 11 and the shutter assembly 100, in such a way to be compressed by the shutter assembly 100 moving towards the bottom portion 17.

The exemplary shutter assembly 100 illustrated in FIGS. 19-21 comprises a frame 110 through which a plurality of openings 101 is defined. In particular, three couples of openings 101a-101b, 101c-101d, 101e-101f are defined through the frame 110; each couple of openings 101a-101b, 101c-101d, 101e-101f is associated to a corresponding connector 22 in the cavity 19 of the supporting frame 11.

In particular, each couple of openings comprises:
- a first opening 101a, 101c, 101e which is defined through the frame 110 for allowing a coupling between a blade 12a and a claw 22a of the corresponding connectors 12 and 22; and
- a second opening 101b, 101d, 101f which is defined through the frame 110 for allowing a coupling between a blade 12b and a claw 22b of the corresponding connectors 12 and 22.

The upper cover member 102 and the lower cover member 103 are configured so as to cover the first and second openings 101a-101b, 101c-101d, 101e-101f associated to each connector 12, when they are in the cover position, and so as to leave the first and second openings 101a-101b, 101c-101d, 101e-101f uncovered, when they are in the open position.

In particular, the upper cover member 102 comprises a couple of through holes 623-624 associated to the couple of openings 101e-101f, a couple of through holes 621-622 associated to the couple of openings 101c-101d, and one through hole 620 associated to the opening 101b.

The lower cover member 103 comprises one through hole 524 associated to the opening 101e of the frame 110, a couple of through holes 522-523 associated to the couple of openings 101c-101d, and a couple of through holes 520-521 associated to the couple of openings 101a-101b.

When the upper and lower members 102 and 103 are in the cover position, their through holes 620-624 and 520-524 are not aligned with the associated openings 101a-101f of the frame 110; in practice, portions of the upper and lower cover members 102, 103 cover the openings 101a-101f avoiding an access therethrough.

When the upper cover member 102 is in the open position:
the through hole 620 is aligned to the opening 101b;
the through holes 621 and 622 are aligned to the openings 101c and 101d, respectively;
the through holes 623 and 624 are aligned to the openings 101e and 101f, respectively.

Further, a length of the upper cover member 102, comprised between edges 701 and 702, is such that the edge 702 is disposed over the frame 110 between the openings 101a and 101b when the upper cover member 102 is in the open position. In this way, in the open position, none of the portions of such member 102 covers the opening 101a.

When the lower cover member 103 is in the open position:
the through holes 520 and 521 are aligned to the openings 101a and 101b, respectively;
the through holes 522 and 523 are aligned to the openings 101c and 101d, respectively;
the through hole 524 is aligned to the opening 101e.

Further, a length of the lower cover member 103, comprised between edges 851 and 852, is such that the edge 851 is disposed over the frame 110 between the openings 101f and 101e, when the lower cover member 103 is in the open position. In this way, in the open position, none of the portions of such member 103 covers the opening 101f.

In this way, when the upper and lower cover members 102 and 103 are in the open position:
a coupling between the blade 12a and the claw 22a of first connectors 12 and 22 can occur through the opening 101a and the hole 520 which are aligned to each other;
a coupling between the blade 12b and the claw 12b of the first connectors 12 and 22 can occur through the opening 101b, the hole 620 and the hole 521 which are aligned to each other;
a coupling between the blade 12a and the claw 22a of second connectors 12 and 22 can occur through the opening 101c, the hole 522 and the hole 621 which are aligned to each other;
a coupling between the blade 12b and the claw 22b of the second connectors 12 and 22 can occur through the opening 101d, the hole 523 and the hole 622 which are aligned to each other;
a coupling between the blade 12a and the claw 22a of third connectors 12 and 22 can occur through the opening 101e, the hole 524 and the hole 623 which are aligned to each other; and
a coupling between the blade 12b and the claw 22b of the third connectors 12 and 22 can occur through the opening 101f and the hole 624 which are aligned to each other.

The upper cover member 102 and lower cover member 103 comprise, for each couple of openings 101a-101b, 101c-101d, 101e-101f, a plurality of inclined contact surfaces 600 and a plurality of inclined contact surfaces 601, respectively.

The contact surfaces 600 are inclined in such a way that, when the shutter assembly 100 is moved toward the bottom portion 17 of the supporting frame 11 by the switching unit 20, the blades 12a of the connectors 12 slide onto the contact surfaces 600 for causing a sliding movement of the upper cover member 102 from the cover position to the open position.

The contact surfaces 601 are inclined in such a way that, when the shutter assembly 100 is moved toward the bottom portion 17 of the supporting frame 11 by the switching unit 20, the blades 12b of the connectors 12 slide onto the contact surfaces 601 for causing a sliding movement of the lower cover member 103 from the cover position to the open position.

In particular, the contact surfaces 600 and the contact surfaces 601 associated to the connector 12 are advantageously inclined in such a way that the contact surfaces 600 and the contact surfaces 601 move towards each other in the space comprised between the blades 12a, 12b of the connector 12.

In this way, the distance between the openings 101a and 101b, 101c and 101d, 101e and 101f can be reduced, resulting in a reduced distance between the blades 12a, 12b and, hence, in compact connectors 12.

Preferably, this effect is further improved according to the solution illustrated in FIGS. 20-21 and 24-26. According to this exemplary solution, the inclined contact surfaces 600 are defined on a shaped element 801 of the upper cover member 102 and the inclined contact surfaces 601 are defined on a shaped element 802 of the lower cover member 103.

Advantageously, the shaped element 802 comprises a recess 803 adapted to receive therein the shaped element 803 when the upper and lower cover members 102 and 103 slide from their cover position to their open position.

In the exemplary embodiment illustrated in FIGS. 19-21, the shaped elements 801 and 802 protrude towards the bottom portion 17 of the supporting frame 11, so as their inclined contact surfaces 600 and 601 are available for the contact to the blades 12a and 12b of the corresponding connectors 12.

With reference to FIG. 20, when the upper and lower cover members 102 and 103 are in the cover position, the shaped elements 801 of the upper cover member 102 pass through the holes 520, 522, 524 of the lower cover members 103, so as to be available for the contact to the blades 12a of the corresponding connectors 12.

In practice, during the sliding movement of the upper and lower cover members 102 and 103 caused by the interaction between the blades 12a and 12b and the corresponding contact surfaces 600, 601, the shaped elements 801 and 802 move towards each other in the space comprised between the blades 12a and 12b. In particular, the movement of the shaped elements 801 and 802 is such that the shaped element 801 inserts into the recess 803 of the shaped element 802.

Preferably, at least one elastic element 900, such as a spring 900, is operatively connected to the upper and lower cover members 102, 103 for causing their return in the cover position when the switching unit 20 is withdrawn from the assembly 10 and the shutter assembly 100 return in its initial, rest, position.

An alternative exemplary shutter assembly 100 having, for each of its openings 101, slidable upper and lower cover members 102 and 103 is disclosed with reference to FIGS. 27 and 28.

The upper cover member 102 and the lower cover member 103 are configured so as to cover at least one opening 101 associated to a corresponding connector 12, when they are in the cover position, and so as to leave the opening 110 uncovered, when they are in the open position.

In the embodiment illustrated in FIG. 27, the connector 12 is pin-shaped and the corresponding connector 22 is a claw 22; in the embodiment illustrated in FIG. 28, the connector 12 is a claw 12 and the corresponding connector 22 is pin-shaped.

The upper cover member 102 comprises a through hole 720 and the lower cover member 103 comprises a through hole 721.

When the upper and lower cover members 102 and 103 are in the cover position, the through holes 720 and 721 are not aligned with the opening 101; in practice, portions of the upper and lower members 102, 103 cover the opening 101 avoiding an access therethrough.

When the upper and lower cover members 102 and 103 are in the open position, the through holes 720 and 721 are aligned to each other and to the opening 101. In this way, a coupling between the corresponding connectors 12 and 22 can occur through the opening 101 and the through holes 720 and 721 which are all aligned to each other.

The upper cover member 102 and the lower cover member 103 comprise at least one inclined contact surface 600 and at least one inclined contact surface 601, respectively.

The contact surface 600 is inclined in such a way that, when the shutter assembly 100 is moved toward the bottom portion 17 of the supporting frame 11 by the switching unit 20, the connector 12 slides onto the contact surface 600 so as to cause a sliding movement of the upper cover member 102 from the cover position to the open position.

The contact surface 601 is inclined in such a way that, when the shutter assembly 100 is moved toward the bottom portion 17 of the supporting frame 11 by the switching unit 20, the connector 12 slides onto the contact surface 601 so as to cause a sliding movement of the lower cover member 102 from the cover position to the open position.

In particular, the contact surfaces 600 and 601 are inclined in such a way that the sliding movement of the upper and cover members 102 and 103 from the cover position to the open position causes a movement of the contact surfaces 600 and 601 away from each other.

Preferably, the assembly 10 according to the present disclosure comprises locking means for blocking the movement of each shutter assembly 100 towards the corresponding bottom portion 17 of the supporting frame 11.

According to the exemplary embodiments illustrated in the attached figures, the locking means comprises at least one tab 210 operatively connected to the shutter assembly 100 and adapted to move between a contact position, where it contacts a corresponding surface 211 of the supporting frame 211, and a disengaged position where it is disengaged from the corresponding surface 211.

According to the exemplary embodiment illustrated in FIGS. 2-8, the locking means comprises at least one locking component 200 which protrudes from and comprises an abutment portion 201 for a corresponding shutter assembly 100.

In particular, the locking component 200 in a locking position is adapted to be operatively constrained, e.g. by a padlock, to the supporting frame 11. In this way, its abutment portion 201 can block an undesired movement of the corresponding shutter assembly 100 towards the bottom portion 17. Therefore, an undesired, dangerous, movement of the cover members 102, 103 from the cover position to the open position by the corresponding connector 12 is avoided while the locking component 200 is constrained in its locking position.

With reference to the exemplary shutter assembly 100 illustrated in FIG. 5-8, two holes 160 are defined through the frame 110, each one placed between two adjacent openings 101. Each one of the holes 160 is adapted to be crossed by a corresponding locking component 200, in such a way that this locking component 200 protrudes from the shutter assembly 100 towards the access 18 of the supporting frame 11.

Each of the locking components 200 is adapted to be moved away from the locking position towards the bottom portion 17 by the switching unit 20 under insertion in the supporting frame 11. Preferably, the locking means further comprise, for each locking component 200, one tab 210 for contacting a corresponding surface 211 of the supporting frame 11.

With particular reference to FIGS. 7 and 8, the locking component 200 and the tab 210 are adapted to operatively interact each other in such a way that:
the tab 210 contacts the corresponding surface 211 when the locking component 200 is in the locking position (FIG. 7); and
the tab 210 disengages from the corresponding surface 11 upon the starting of the movement of the locking component 200 away from the locking position (FIG. 8).

In this way, the contact between the tab 210 and the corresponding surface 211 blocks an accidental movement of the shutter assembly 100 towards the bottom portion 17, even if the locking component 200 in the locking position is not constrained to the supporting frame 11. In other words, the tab 210 provides an additional guarantee to avoid an accidental access by an operator to the connectors 12.

The locking component 200 is adapted to be moved away from its locking position by the switching unit 20 under insertion into the supporting frame 11, before that the switching unit 20 starts moving the shutter assembly 100 towards the bottom portion 17. In this way, the shutter assembly 100 is free to be moved by the switching unit 20, i.e. there is no more a constrain between the shutter assembly 100 and a fixed part such as the supporting frame 11.

Preferably, a spring 31 is operatively connected to the supporting frame 11 and to each one of the locking components 200, in such a way to be compressed by the locking component 200 moved away from the locking position by the switching unit 20. In this way, the spring 31 can cause the return of the corresponding locking component 200 to the locking position, when the switching unit 20 is withdrawn from the supporting frame 11.

According the exemplary embodiment illustrated in FIGS. 19-23, the shutter assembly 10 comprises a movable portion 500 operatively associated to each one of its tabs 210.

Figure 23:
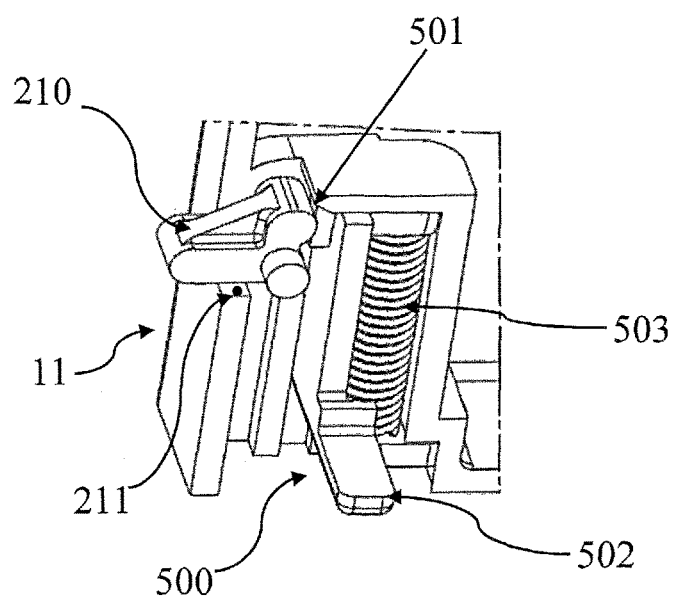

The movable portion 500 comprises a surface 501 adapted to keep the associated tab 210 in the contact position with respect to the corresponding surface 211 of the supporting frame 11, as illustrated in FIG. 23.

In this way, the contact between the tab 210 and the corresponding surface 211 blocks an accidental movement of the shutter assembly 100 towards the bottom portion 17, in such a way to avoid an accidental access by an operator to the connectors 12.

The movable portion 500 is adapted to be moved by the switching unit 20 under insertion into the supporting frame 11, before that the pushing elements 24 start pushing the frame assembly 100 towards the bottom portion 17.

Figure 22:
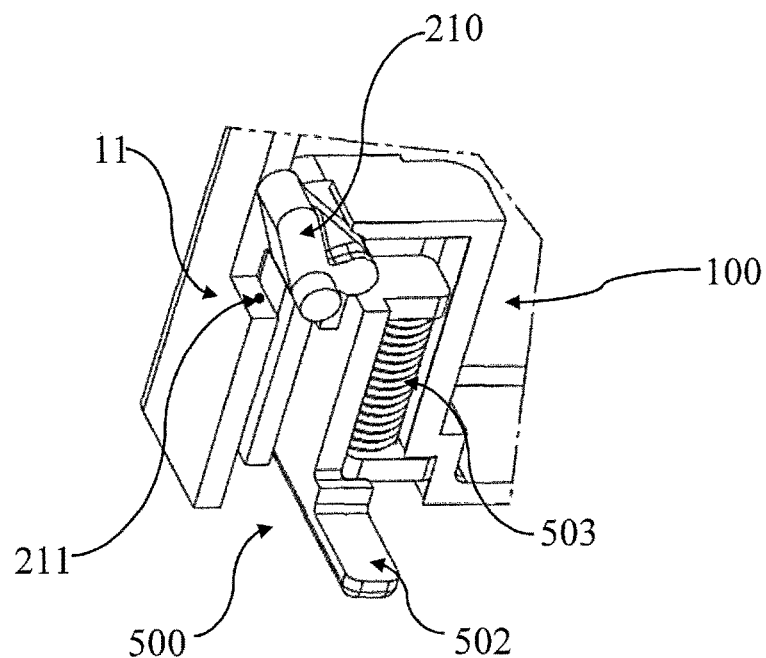
FIGS. 22 and 23 are perspective views of a portion of the assembly illustrated in FIG. 16, for illustrating locking means associated to the shutter assembly.

In particular, the movable portion 500 is adapted to be moved by the switching unit 20 in such a way that the surface 501 disengages from the tab 210 which becomes free to reach its disengaged position with respect to the corresponding surface 211 of the supporting frame 11, as illustrated in FIG. 22.

For example, the movable portion 500 illustrated in FIGS. 22 and 23 comprises a tongue 502 adapted to be intercepted by the switching unit 20 under insertion into the supporting frame 11. The force exerted by the switching unit 20 on the tongue 502 is suitable for causing a lowering movement of the portion 500 with respect to the frame 110 of the shutter assembly 100, towards the bottom portion 17 of the supporting frame 11.

Preferably, the movable portion 500 is operatively connected to a spring 503 in such a way that the lowering movement of the portion 500 causes a compression of this spring 502. The compressed spring 502 is adapted to cause the return of the movable portion 500 to its rest position as illustrated in FIG. 23, when the switching unit 20 is withdrawn from the supporting frame 11. The inserting and withdrawing operations of the switching unit 20 into/from the corresponding supporting frame 11 of the assembly 10 are disclosed in the followings, by making particular reference to the exemplary embodiments of FIGS. 1-14 and of FIGS. 16-26.

With reference to FIG. 2, before an insertion of the switching unit 20 into the supporting frame 11, the shutter assemblies 100 are in their initial positions, where their first and second cover members 102 and 103 are in the cover position and they cover the respective openings 101.

In this situation, the locking components 200 associated to the shutter assemblies 100 can be constrained to the supporting frame 1, to lock the shutter assemblies 100. Even if this constrain does not occur, the tabs 210 are in contact with the corresponding surfaces 211 of the supporting frame 11, so as to prevent an undesired movement of the shutter assemblies 100 towards the corresponding bottom portions 17 of the supporting frame 11.

After removing an eventual constrain of the locking components 200 to the supporting frame 11, the switching unit 20 is placed in its disconnected position with respect to the supporting frame 11, as illustrated in FIGS. 9 and 12.

With reference to FIG. 8, while reaching the disconnected position as illustrated in FIGS. 9 and 12, the switching unit 20 causes a displacement of the locking elements 200 away from their locking position. This displacement causes the tabs 210 to disengage from the corresponding surfaces 211 of the supporting frame 11; hence, the shutter assemblies 100 are free to start being pushed by the switching unit 20 moving towards the disconnected position.

The pushing elements 24 of the switching unit 20 in the disconnected position are in contact with the frame 110 of the corresponding shutter assemblies 100.

Upon the starting of the movement of the switching unit 20 from the disconnected position, towards the bottom portion 17 of the supporting frame 11, the elements 24 push the shutter assembly 100 also towards the bottom portion 17.

Preferably, the inserting movement of the switching unit 20 into the supporting frame 11 can be stopped at the test position as illustrated in FIGS. 10 and 13, where at least test and/or control functionalities on the switching unit 20 can be performed.

The switching unit 20 is then further moved away from the test position, so as to reach the connected position as illustrated in FIGS. 11 and 14; during such movement the switching unit 20 further pushes the shutter assemblies 100 toward the bottom portion 17, from which the connectors 12 protrudes.

During this pushing, each connector 12 inserts between the first and second cover members 102, 103 clearing the corresponding opening 101. In particular, such insertion causes the rotation of the first cover member 102 and the second cover member 103 about the first rotation axis 112 and the second rotation axis 113, respectively, from their cover position illustrated in FIGS. 10 and 13 to their open position illustrated in FIGS. 11 and 14.

Upon the insertion between the first and second cover members 102, 103, the connector 12 passes through the opening 101 and starts contacting the corresponding connector 22, to reach the coupled position as illustrated in FIGS. 11 and 14.

The connector 12 in this coupled position keeps the first and second cover members 102 and 103 separated from each other in their open position.

During the above mentioned movement of the switching unit 20 from the disconnected position to the connected position, the springs 30 are compressed by the corresponding shutter assemblies 100. Hence, considering the withdrawing of the switching unit 20 from the supporting frame 11, the compressed springs 30 elongate to return in their rest position while the switching unit 20 is moving away with respect to the bottom portion 17. In practice, the springs 30 cause a return of the corresponding shutter assemblies 100 in their initial position as illustrated in FIG. 2.

The spring 105 between the first and second cover members 102 and 103 cause their return in the cover position, as soon as the connector 12 disengages from them, due to shutter 100 return towards the initial position.

The springs 31, also compressed during the movement of the switching unit 20 from the connected to the disconnected position, cause the return of the corresponding locking components 200 in their locking position, while the switching unit 20 is withdrawn from the supporting frame 11.

With reference to FIG. 16, before an insertion of the switching unit 20 illustrated in FIG. 18 into the supporting frame 11, the shutter assemblies 100 are in their initial positions, where their first and second cover members 102 and 103 are in the cover position and they cover the respective openings 101a-101f.

With reference to FIG. 23, in this situation the tabs 210 are in contact with the corresponding surfaces 211 of the supporting frame 11, so as to prevent an undesired movement of the shutter assemblies 100 towards the corresponding bottom portions 17 of the supporting frame 11.

During its insertion into the supporting frame 11, the switching unit 20 intercepts the tongues 502 of the movable portions 500 causing a lowering movement of such portions 500 towards the bottom portion 17 of the supporting frame 11, and a corresponding compression of the springs 503.

Due to the lowering movement of the portions 500, the surfaces 501 disengages from the tabs 210 which in turn are free to disengage from the corresponding surfaces 211 of the supporting frame 11, as illustrated in FIG. 23.

In this way, the shutter assemblies 100 become free to be pushed by the switching unit 20 moving towards the bottom portion 17 of the supporting frame 11. In particular, this movement of the shutter assemblies 100 is caused by the pushing elements 24 of the switching unit 20 under insertion into the supporting frame 11.

Preferably, the inserting movement of the switching unit 20 into the supporting frame 11 can be stopped at a test position, where at least test and/or control functionalities on the switching unit 20 can be performed.

The switching unit 20 is then further moved away from the test position, so as to reach the connected position as illustrated in FIG. 26; during such movement the switching unit 20 further pushes the shutter assemblies 100 toward the bottom portion 17, from which the connectors 12 protrudes.

With reference to only one shutter assembly 100, during the movement of such shutter assembly 100 towards the bottom portion 17, the blades 12a of the connectors 12 start contacting and slide on the corresponding inclined contact surfaces 600 of the shaped elements 801 of the upper cover member 102. During the same movement, the blades 12b of the connectors 12 start contacting and slide on the corresponding inclined contact surfaces 601 of the shaped elements 802 of the lower cover member 103.

Due to the sliding of the blades 12a on the corresponding inclined contact surfaces 600, the upper cover member 102 is forced to slide from the cover position (as illustrated for example in FIG. 24) to the open position (as illustrated for example in FIG. 26). This sliding of the upper cover member 102 causes an alignment between its through holes 620, 621, 622, 623, 624 with the corresponding openings 101b, 101c, 101d, 101e and 101f of the frame 110.

Further, due to this sliding, the edge 702 moves in a position over the frame 110 between the openings 101a and 101b, so as to leave the opening 101a uncovered.

Due to the sliding of the blades 12b on the corresponding inclined contact surfaces 601, the lower cover member 103 is forced to slide from the cover position (as illustrated for example in FIG. 24) to the open position (as illustrated for example in FIG. 26). This sliding of the lower cover member 103 causes an alignment between its through holes 520, 521, 522, 523 and 524 with the corresponding openings 101a, 101b, 101c, 101d and 101e of the frame 110.

Further, due to this sliding, the edge 851 moves in a position over the frame 110 between the openings 101e and 101f, so as to leave the opening 101f uncovered.

Hence, the sliding at the same time of the upper and lower cover members 102 and 103 from the cover position to the open position causes a clearance of the openings 101a, 101b, 101c, 101d, 101e and 101f. In this way, the blades 12a and 12b of the connectors 12 can pass through the associated openings 101a, 101b, 101c, 101d, 101e, 101f for coupling with the corresponding claws 22a, 22b of the connectors 22.

For example, in FIG. 26 is illustrated how the blade 12a of the connector 12 passes through the aligned opening 101a and through hole 520 of the lower cover member 103 so as to couple with the claw 22a of the corresponding connector 12. The blade 12b of the illustrated connector 12 passes through the opening 101, the hole 620 of the lower cover member 103 and the hole 521 of the upper cover members 102, so as to couple with the claw 22b of the corresponding connector 22.

Advantageously, during the sliding of the upper and lower cover member 102, 103 from the cover position to the open position, the surfaces 600 and surfaces 601 come closer to each other by moving into the space between the blades 12a and 12b of the connector 12.

In particular, during such sliding of the upper and lower cover members 102, 103, the shaped element 801 inserts into the recess 803 defined in the second shaped element 802.

During the above mentioned movement of the switching unit 20 toward the connected position, the springs 30 are compressed by the corresponding shutter assemblies 100. Hence, considering the withdrawing of the switching unit 20 from the supporting frame 11, the compressed springs 30 elongate to return in their rest position while the switching unit 20 is moving away with respect to the bottom portion 17. In practice, the springs 30 cause a return of the corresponding shutter assemblies 100 in their initial position as illustrated in FIG. 16.

The springs 900 operatively connected to the upper and lower cover members 102 and 103 (only one of which is illustrated in FIG. 24-26) cause the return of such members 102 and 103 in their cover position, as soon as the blades 12a and 12b of the connectors 12 disengage from the corresponding inclined contact surfaces 600 and 601.

While the switching unit 20 is further withdrawn from the supporting frame 211, the compressed springs 503 cause the return of the corresponding movable portions 500 of the shutter assemblies 100 in their initial position where their surfaces 501 keep the tabs 210 in the engaged position with respect the corresponding surfaces 211 of the supporting frame 11.

In practice, it has been seen how the assembly 10 and related withdrawable switching device 1 allow achieving the intended objective offering significant improvements over known solutions.

In particular, the assembly 10 according to the present disclosure allows the movement of the cover members 102, 103 of its shutter assemblies 100, from their cover to their open position, without using a dedicated shutter mechanism acting on the cover members 102, 103.

Indeed, the opening of the cover members 102, 103 is only due to the movement of the shutter assembly 100 towards the bottom portion 17, and to the corresponding connector 12 protruding from such portion 17.

This means a reduction of space into the supporting frame 11, and a more reliable opening operation of the cover members 102, 103 with respect to the known shutter mechanisms subjected to high frictions and other mechanical stresses.

Furthermore, there is no need of adding a safety distance to the path traveled by the switching unit 20 into the supporting frame 11. Indeed, the movement of the cover members 102, 103 of each shutter assembly 100 is directly caused by pushing such cover members 102, 103 on the corresponding connector 12, hence without using a shutter mechanism of the known type which requires a safety distance to wait the end of its opening operation. This applies even in the more critical solution where the connectors 22 of the switching unit 20 comprise a claw 22.

Furthermore, considering the exemplary embodiment illustrated in the attached figures, in which the first and second cover member 102 and 103 are adapted to be rotated by the corresponding connector 12, no additional distance has to be added to the traveled path of the switching unit 20 for allowing such rotation. Indeed, such rotation is caused by moving the shutter assemblies 100 towards the corresponding portions 17, so as to push the cover members 102, 103 against the corresponding connector 12.

The assembly 10 thus conceived also provides advantages in view of the extraction of the switching unit 20 from the supporting frame 11.

Even considering an offset with respect to the predicted position of the switching unit 20 under extraction, due to the mechanical clearance introduced by the guiding mechanism, the movement of the cover members 102, 103 from their open position to their cover position always occurs correctly. Indeed, this opening movement is guided by the disengagement between such cover members 102, 103 and the corresponding connector 12.

The assembly 10 and related withdrawable switching device 1 thus conceived are also susceptible of modifications and variations, all of which are within the scope of the inventive concept as defined in particular by the appended claims.

For example, a shutter assembly 100 can be provided having, for each of its openings 101, a slidable first cover member 102 and a slidable second cover member 103 substantially laying on a same plane. In this solution, the sliding of such members 102, 103 from the cover position to the open position can be caused by the insertion between them of a connector 12, which in this way can reach and couple with a corresponding connector 22.

For example, even if according to the exemplary embodiment illustrated in FIGS. 9-14 the switching unit 20 starts contacting the shutter assemblies 100 at its disconnected position, alternatively the shutter assemblies 100 can be operatively mounted into the supporting frame 11 so as the switching unit 20 starts contacting and moving them after the disconnected position, e.g. at the test position or between the test position and the connected position.

Even if in the exemplary embodiment illustrated in FIGS. 2-3 the assembly 10 comprises three upper connectors 12, three lower connectors 12 and two corresponding shutter assemblies 100, each having three openings 101, the number of connectors 12 and/or the number of shutter assemblies 100 can be different with respect to the illustrated one.

For example, if the switching unit 20 comprises four electrical poles, the assembly 10 would comprise four upper connectors 12, four lower connectors 12 and two corresponding shutter assemblies 100, each having four openings 101 or four couple of openings 101. Alternatively, this assembly 10 can comprise two upper shutter assemblies 100, each having two openings 101 or two couple of openings 101 for two corresponding upper connectors 12, and two lower shutter assemblies 100, each having two opening openings 101 or two couple of openings 101 for two corresponding lower connectors 12.

Figure 15:
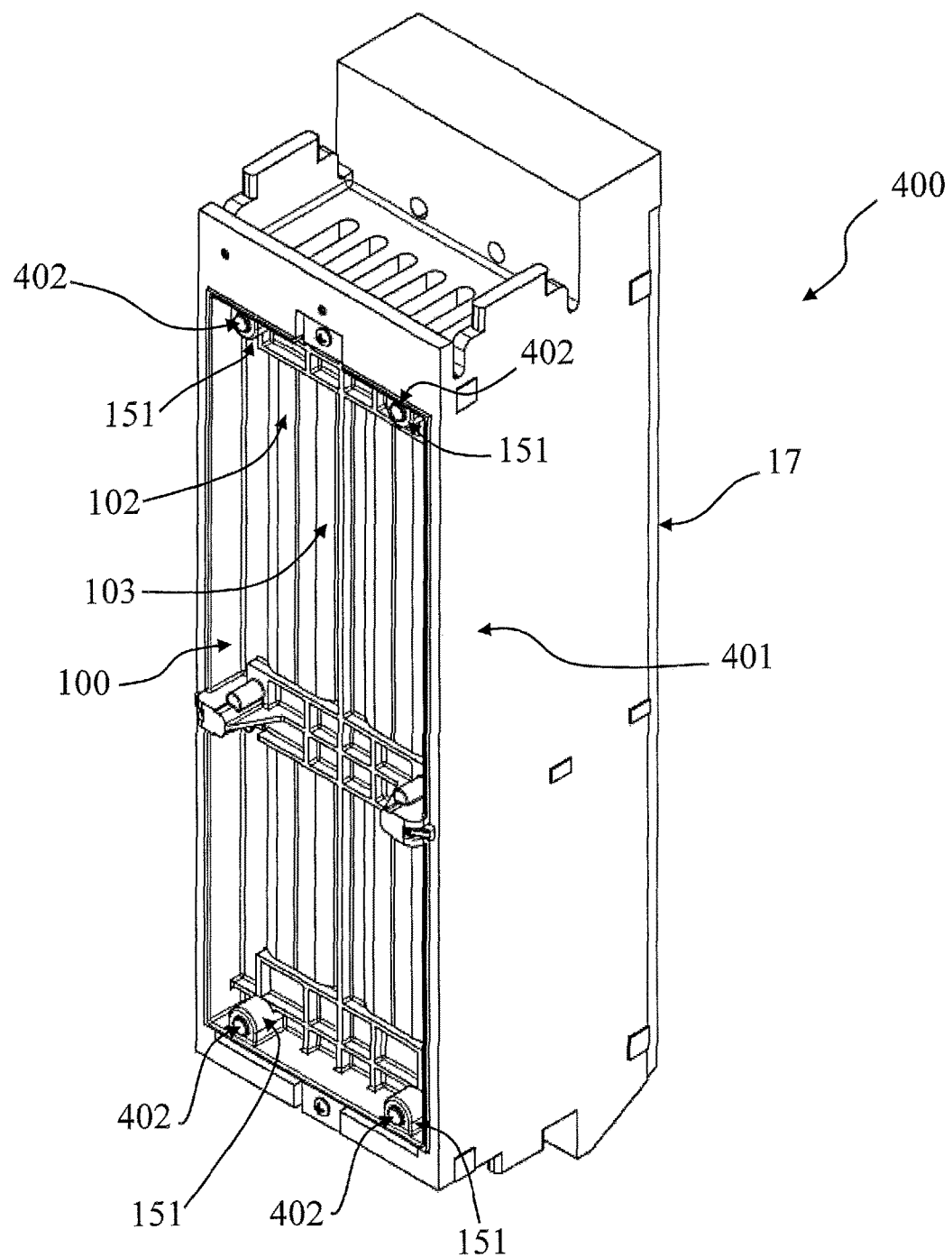
FIG. 15 illustrates a modular component of an assembly for a withdrawable switching device according to the present disclosure.

For example, with reference to FIG. 15, the assembly 10 can comprise a plurality of modules 400 which can be modularly positioned adjacent to each other and linked by metal pieces, so as to assemble the rear part of the supporting frame 11.

Each of the modules 400 corresponds to a pole of the switching unit 20 and comprises a casing 401 having a wall 17 which defines a corresponding bottom portion 17 of the supporting frame 11. Connectors 12 are placed at and protrude from the wall 17 for coupling with the corresponding connectors 22 of the pole.

In the exemplary embodiment illustrated in FIG. 15, even not viewable in such figure, two upper connectors 12 and two lower connectors 12 are placed at the wall 17, and a shutter assembly 100 is operatively mounted movable in the casing 401. Preferably, the shutter assembly 100 comprises hole portions 151 which can slide on corresponding guiding pins 402 connected to the casing 401, for allowing the movement of the shutter assembly 100 towards and away with respect to the wall 17.

The illustrated shutter assembly 100 comprises four openings 101, each one associated to a corresponding connector 12, and it is adapted to operatively interact with the switching unit 20 under insertion into the supporting frame 11 to be moved towards the wall 17. This movement causes the displacement of the cover members 102, 103 associated to each opening 101, from their cover position to the open position, by an element protruding from the wall 17, preferably by the connector 12 itself.

In practice, all parts/components can be replaced with other technically equivalent elements; in practice, the type of materials, and the dimensions, can be any according to needs and to the state of the art.

The invention claimed is:
1. An assembly for a withdrawable switching device adapted to be installed in a low voltage electrical circuit, said assembly comprising:
   a supporting frame into which a switching unit of the withdrawable switching device can be inserted and from which the switching unit can be withdrawn;
   at least one first connector placed at and protruding from a bottom portion of the supporting frame, said at least one first connector being adapted to be coupled with a corresponding second connector of the switching unit when the switching unit reaches a connected position into the supporting frame;
   a shutter assembly comprising:
      an opening for allowing the coupling between said first connector and the corresponding second connector; and
      at least one cover member which is adapted to be moved from a cover position to an open position so as to make said opening accessible for the coupling between the first connector and the corresponding second connector;
   wherein:
      said at least one cover member is adapted to be moved from the cover position to the open position by said first connector;
      said shutter assembly is operatively mounted movable into the supporting frame; and
      said shutter assembly is adapted to operatively interact with said switching unit under insertion into the supporting frame as to be moved towards said bottom portion for causing the movement of said at least one cover member from the cover position to the open position by said first connector.

2. The assembly according to claim 1, wherein said shutter assembly is adapted to be pushed towards said bottom portion by said switching unit under insertion into the supporting frame.

3. The assembly according to claim 2, wherein said shutter assembly is adapted to be contacted by the switching unit when the switching unit is in a disconnected position.

4. The assembly according to claim 1, wherein said at least one cover member comprises a first cover member and a second cover member which are adapted to be moved by said first connector from the cover position to the open position.

5. The assembly according to claim 4, wherein said at least one cover member comprises a first cover member and a second cover member which are adapted to be moved by said first connector from their cover position, where said first and second cover members are adjacent to each other, to their open position, where said first and second cover members are separated from each other.

6. The assembly according to claim 5, wherein said first and second cover members are adapted to be moved from their cover position to their open position by the insertion between them of said first connector.

7. The assembly according to claim 5, wherein said first cover member and said second cover member are adapted to be rotated by said first connector from the cover position to the open position about a first axis of rotation and a second axis of rotation, respectively.

8. The assembly according to claim 7, wherein said shutter assembly comprises a frame through which said opening is defined, and wherein said first and second cover members are pivotally mounted to said frame.

9. The assembly according to claim 8, wherein said frame comprises:
a cavity under said opening;
at least one first portion extending into the cavity and defining a first seat for receiving therein a corresponding pin portion of the first cover member;
at least one second portion extending into the cavity and defining a second seat for receiving therein a corresponding pin portion of the second cover member.

10. The assembly according to claim 9, wherein:
said at least one first portion comprises a first surface of contact for the first cover member, said first surface of contact being defined between said opening and said first seat;
said at least one second portion comprises a second surface of contact for the second cover member, said second surface of contact begin defined between said opening and said second seat.

11. The assembly according to claim 4, wherein said first cover member and said second cover member are adapted to be slid by said first connector from the cover position to the open position.

12. The assembly according to claim 11, wherein:
said shutter assembly comprises a frame through which said opening is defined;
said first cover member and said second cover member are an upper cover member and a lower cover member, respectively, which are slidably operatively mounted on the frame;
said upper cover member and said lower cover member are configured so as to cover the opening in the cover position, and so as to leave the opening uncovered in the open position.

13. The assembly according to claim 12, wherein said upper cover member and said tower cover member comprise one or more first contact surfaces and one or more second contact surfaces, respectively, onto which said first connector can slide in such a way to cause said sliding movement of the upper and lower cover members from the cover position to the open position.

14. The assembly according to claim 13, wherein:
a first opening is defined through said frame for allowing the coupling between a first blade of said first, connector and a first claw of the corresponding second connector; and
a second opening is defined through said frame for allowing the coupling between a second blade of the first connector and a second claw of the corresponding second connector;
said upper cover member and lower cover member are configured so as to cover said first and second openings in the cover position, and so as to leave said first and second openings uncovered in the open position;
said one or more first contact surfaces and said one or more second contact surfaces are shaped in such a way that a sliding of said first blade on the one or more first contact surfaces and a sliding of said second blade on the one or more second contact surfaces cause the sliding movement of the upper and lower cover members from the cover position to the open position;
said sliding movement of the upper and lower cover members being such that the one or more first contacts surfaces and the one or more second contact surfaces move towards each other in a space between said first and second blades.

15. The assembly according to claim 14, wherein:
said one or more first contact surfaces are defined on a first shaped element of the upper cover member and said one or more second contact surfaces are defined on a second shaped element of the lower cover member; and
one of said first and second shaped elements comprises a recess (803) adapted to receive the other of said first and second shaped elements when said upper and lower cover members slide from the cover position to the open position.

16. The assembly according to claim 1, wherein at least one first elastic element is operatively connected to said supporting frame and to said shutter assembly, in such a way to be compressed by the shutter assembly moving towards said bottom portion.

17. The assembly according to claim 1, comprising locking means for blocking the movement of the shutter assembly towards the bottom portion.

18. The assembly according to claim 17, wherein said locking means comprise at least one tab operatively connected to said shutter assembly and adapted to move between a contact position, where said tab contacts a corresponding surface of the supporting frame, and a disengaged position where said tab is disengaged from said corresponding surface.

19. The assembly according to claim 17, wherein said locking means comprise at least one locking component which protrudes from the shutter assembly and which defines an abutment portion for the shutter assembly, and wherein said locking component in a locking position is adapted to be operatively constrained to said supporting frame.

20. A withdrawable switching device adapted to be installed in a low voltage electrical circuit, comprising:
a switching unit;
a supporting frame into which the switching unit of the withdrawable switching device can be inserted and from which the switching unit can be withdrawn;
at least one first connector placed at and protruding from a bottom portion of the supporting frame, said at least one first connector being adapted to be coupled with a corresponding second connector of the switching unit when the switching unit reaches a connected position into the supporting frame;
shutter assembly comprising:
an opening for allowing the coupling between said first connector and the corresponding second connector; and
at least one cover member which is adapted to be moved from a cover position to an open position so as to make said opening accessible for the coupling between the first connector and the corresponding second connector;
wherein:
said at least one cover member is adapted to be moved from the cover position to the open positron by said first connector;
said shutter assembly is operatively mounted movable into the supporting frame; and
said shutter assembly is adapted to operatively interact with said switching unit under insertion into the supporting frame so as to be moved towards said bottom portion for causing the movement of said at least one cover member from the cover position to the open position by said first connector.

\* \* \* \* \*